US010516434B2

United States Patent
Chang et al.

(10) Patent No.: US 10,516,434 B2
(45) Date of Patent: Dec. 24, 2019

(54) COMMUNICATION CIRCUIT ENABLING OPTIMAL SYNCHRONIZATION FOR SELF-INTERFERENCE CANCELLATION (SIC) IN A WIRELESS COMMUNICATIONS SYSTEM (WCS)

(71) Applicant: Corning Incorporated, Corning, NY (US)

(72) Inventors: Gee-Kung Chang, Corning, NY (US); Lin Cheng, Louisville, CO (US); Anthony Ng'Oma, Horseheads, NY (US); Po-Tsung Shih, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 96 days.

(21) Appl. No.: 15/922,217

(22) Filed: Mar. 15, 2018

(65) Prior Publication Data

US 2018/0269923 A1 Sep. 20, 2018

Related U.S. Application Data

(60) Provisional application No. 62/472,848, filed on Mar. 17, 2017.

(51) Int. Cl.
*H04B 1/525* (2015.01)
*H04B 1/04* (2006.01)
(Continued)

(52) U.S. Cl.
CPC .............. *H04B 1/525* (2013.01); *H04B 1/04* (2013.01); *H04B 15/02* (2013.01); *H04B 2001/0425* (2013.01); *H04L 5/1461* (2013.01)

(58) Field of Classification Search
CPC .......... H04B 1/525; H04B 1/04; H04B 15/02; H04B 2001/0425; H04L 5/1461
See application file for complete search history.

(56) References Cited

U.S. PATENT DOCUMENTS 9,054,835 B2 * 6/2015 Kwon ..................... H04L 5/001
9,363,051 B2 * 6/2016 Yamazaki ............. H04W 16/28
(Continued)

OTHER PUBLICATIONS

Author Unknown, "Common Public Radio Interface (CPRI); Interface Specification," CPRI Specification, Version 7.0, Oct. 9, 2015, 128 pages.
(Continued)

*Primary Examiner* — Lewis G West
(74) *Attorney, Agent, or Firm* — C. Keith Montgomery

(57) ABSTRACT

A communication circuit in a wireless communications system (WCS) is provided. The WCS employs self-interference cancellation (SIC) circuitry to suppress an interference signal(s) associated with an uplink communications signal(s) in a target uplink band(s). A communication circuit is employed to provide more accurate temporal and phase estimates about interference signal(s) in the target uplink band(s). The communication circuit utilizes an anchor downlink signal, which can be any of the downlink communications signals communicated in the WCS, to help determine an optimal phase shift for uplink communications signal(s) in the target uplink band(s). Accordingly, the SIC circuitry can suppress the interference signal(s) in the target uplink band(s) based on the optimal phase shift. By determining the optimal phase shift in the target uplink band(s), it is possible to achieve accurate temporal and phase synchronization in the SIC circuitry, thus helping to achieve higher and more stable interference suppression in the WCS.

20 Claims, 13 Drawing Sheets

(51) Int. Cl.
*H04L 5/14* (2006.01)
*H04B 15/02* (2006.01)

(56) References Cited

U.S. PATENT DOCUMENTS

| | | | |
|---|---|---|---|
| 9,451,575 B2* | 9/2016 | Siomina | G01S 5/0205 |
| 10,218,548 B1* | 2/2019 | Lohning | H04L 27/2657 |
| 10,218,549 B1* | 2/2019 | Lohning | H04L 7/00 |
| 2010/0238857 A1* | 9/2010 | Zhang | H04L 27/2601 |
| | | | 370/328 |
| 2011/0268217 A1* | 11/2011 | Gormley | H04L 5/0035 |
| | | | 375/295 |
| 2015/0229461 A1* | 8/2015 | DiFazio | H04L 5/14 |
| | | | 370/280 |
| 2017/0141886 A1* | 5/2017 | Chung | H04L 1/0003 |
| 2018/0262232 A1* | 9/2018 | Nabetani | H04B 1/525 |

OTHER PUBLICATIONS

Ahmed, E., et al., "All-Digital Self-Interference Cancellation Technique for Full-Duplex Systems," IEEE Transactions on Wireless Communications, vol. 14, Issue 7, 2015, pp. 3519-3532.

Guiomar, F.P., et al., "Experimental Demonstration of a Frequency-Domain Volterra Series Nonlinear Equalizer in Polarization-Multiplexed Transmission," Optics Express, vol. 21, Issue 1, Jan. 2013, 13 pages.

Hong, Steven, et al., "Applications of Self-interference Cancellation in 5G and Beyond," IEEE Communications Magazine, vol. 52, Issue 2, Feb. 2014, pp. 114-121.

\* cited by examiner

COMMUNICATION CIRCUIT ENABLING OPTIMAL SYNCHRONIZATION FOR SELF-INTERFERENCE CANCELLATION (SIC) IN A WIRELESS COMMUNICATIONS SYSTEM (WCS)

CROSS-REFERENCE TO RELATED APPLICATIONS

This application claims the benefit of priority under 35 U.S.C. § 119(e) of U.S. Provisional Application Ser. No. 62/472,848 filed on Mar. 17, 2017, the content of which is relied upon and incorporated herein by reference in its entirety.

BACKGROUND

The disclosure relates generally to wireless communications systems (WCSs), such as wireless distribution systems (WDSs), distributed antenna systems (DASs), remote radio head (RRH) systems, and small radio cell systems and, more particularly, to supporting self-interference cancellation in a WDS employing software-defined remote units.

Wireless customers are increasingly demanding wireless communications services, such as cellular communications services and Wireless Fidelity (WiFi) services. Thus, small cells, and, more recently, WiFi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of WDSs. Examples of WDSs include DASs, RRH systems, and small radio cell systems (e.g., femtocell systems). WDSs include remote units configured to receive and transmit downlink communications signals to client devices within the antenna range of the respective remote units. WDSs can be particularly useful when deployed inside buildings or other indoor environments where the wireless communications devices may not otherwise be able to effectively receive radio frequency (RF) signals from a source.

In this regard, FIG. 1 illustrates a wireless distribution system (WDS) 100 that is configured to distribute communications services to remote coverage areas 102(1)(1)-102(M)(N), where 'N' is the number of remote coverage areas. The WDS 100 can be configured to support a variety of communications services that can include cellular communications services, wireless communications services, such as RF identification (RFID) tracking, WiFi, local area network (LAN), wireless LAN (WLAN), and wireless solutions (Bluetooth, WiFi Global Positioning System (GPS) signal-based, and others) for location-based services, and combinations thereof, as examples. For example, the WDS 100 may be a DAS or an RRH system. The remote coverage areas 102(1)(1)-102(M)(N) are created by and centered on remote units 104(1)(1)-104(M)(N) connected to a head-end unit (HEU) 106. The remote units 104(1)(1)-104(M)(N) are shown arranged in rows '1-M,' each with columns '1-N' for convenience, and are located in a building 108 or in an area of the building 108. The HEU 106 may be communicatively coupled to a base transceiver station (BTS) or a baseband unit (BBU). The HEU 106 receives downlink communications signals 112D from the BTS and/or the BBU to be communicated to the remote units 104(1)(1)-104(M)(N). The downlink communications signals 112D are communicated by the HEU 106 over a communications link 114 to the remote units 104(1)(1)-104(M)(N). The remote units 104(1)(1)-104(M)(N) are configured to receive the downlink communications signals 112D from the HEU 106 over the communications link 114. The remote units 104(1)(1)-104(M)(N) may include an RF transmitter/receiver (not shown) and a respective antenna operably connected to the RF transmitter/receiver to wirelessly distribute the communications services to user equipment (UE) 116 within the respective remote coverage areas 102(1)(1)-102(M)(N). The remote units 104(1)(1)-104(M)(N) are also configured to receive uplink communications signals 112U from the UE 116 in the respective remote coverage areas 102(1)(1)-102(M)(N) to be communicated to the HEU 106.

With continuing reference to FIG. 1, the WDS 100 is evolving from an Application Specific Integrated Circuit (ASIC)-based architecture into a software-defined-radio (SDR)-based structure. In a non-limiting example, the remote units 104(1)(1)-104(M)(N) may be provided as SDR-based remote units. The application of SDR improves flexibility of the remote units 104(1)(1)-104(M)(N) with respect to spectrum utilization, system configuration, and/or software upgrade. However, to support SDR, it is necessary to remove hardware-based narrow-band filters and/or duplexers from the remote units 104(1)(1)-104(M)(N). As a result, the remote units 104(1)(1)-104(M)(N) may not provide adequate suppression of in-band and out-of-band leakages, which are mainly induced by nonlinear components (e.g., power amplifier, filter, etc.) in the remote units 104(1)(1)-104(M)(N). These leakages cause or increase downlink-to-uplink (DL-to-UL) interference when the WDS 100 employs frequency-division duplex (FDD) and/or full-duplex (FDx) schemes and, consequently, reduce sensitivity and dynamic range of UL receivers for receiving the uplink communications signals 112U. As a result, both analog and digital self-interference cancellation (SIC) approaches have been developed to help mitigate the DL-to-UL interference in the WDS 100.

No admission is made that any reference cited herein constitutes prior art. Applicant expressly reserves the right to challenge the accuracy and pertinency of any cited documents.

SUMMARY

Embodiments of the disclosure relate to a communication circuit in a wireless communications system (WCS), such as a wireless distribution system (WDS). In examples discussed herein, the WCS includes software-defined remote units configured to communicate downlink and uplink communications signals with a head-end unit (HEU) based on frequency-division duplex (FDD) and/or full-duplex (FDx) schemes. The WCS employs self-interference cancellation (SIC) circuitry to suppress an interference signal(s) associated with an uplink communications signal(s) in a target uplink band(s). In this regard, a communication circuit is employed (e.g., in the HEU) to provide more accurate temporal and phase estimates about the interference signal(s) in the target uplink band(s). More specifically, the communication circuit utilizes an anchor downlink signal, which can be any of the downlink communications signals communicated in the WCS, to help determine an optimal phase shift for an uplink communications signal(s) in the target uplink band(s). Accordingly, the SIC circuitry can suppress the interference signal(s) in the target uplink band(s) based on the optimal phase shift. By determining the optimal phase shift in the target uplink band(s), it is possible to achieve accurate temporal and phase synchronization in the SIC circuitry, thus helping to achieve higher and more stable interference suppression in the WCS.

In one exemplary aspect, a communication circuit in WCS is provided. The communication circuit includes a transmit circuit configured to transmit at least one downlink communications signal in at least one downlink band. The communication circuit also includes a receive circuit configured to receive at least one uplink communications signal in at least one uplink band. The at least one uplink communications signal comprises at least one interference signal leaked from the transmit circuit to the receive circuit. The communication circuit also includes a signal processing circuit coupled to the transmit circuit and the receive circuit. The signal processing circuit is configured to receive the at least one downlink communications signal and the at least one uplink communications signal. The signal processing circuit is also configured to determine an anchor downlink signal based on the at least one downlink communications signal. The signal processing circuit is also configured to determine an anchor temporal term and an anchor phase term associated with the anchor downlink signal. The signal processing circuit is also configured to determine at least one optimal temporal term and at least one optimal phase term configured to suppress the at least one interference signal in the at least one uplink band. The signal processing circuit is also configured to generate at least one phase-synchronized uplink signal comprising the at least one uplink communications signal and having a linear phase shift defined by the anchor temporal term, the anchor phase term, the at least one optimal temporal term, and the at least one optimal phase term. The signal processing circuit is also configured to suppress the at least one interference signal in the at least one uplink band based on the at least one phase-synchronized uplink signal.

An additional embodiment of the disclosure relates to a method for enabling optimal synchronization for SIC in a WCS. The method includes transmitting at least one downlink communications signal in at least one downlink band. The method also includes receiving at least one uplink communications signal comprising at least one interference signal in at least one uplink band. The method also includes determining an anchor downlink signal based on the at least one downlink communications signal. The method also includes determining an anchor temporal term and an anchor phase term associated with the anchor downlink signal. The method also includes determining at least one optimal temporal term and at least one optimal phase term configured to suppress the at least one interference signal in the at least one uplink band. The method also includes generating at least one phase-synchronized uplink signal comprising the at least one uplink communications signal and having a linear phase shift defined by the anchor temporal term, the anchor phase term, the at least one optimal temporal term, and the at least one optimal phase term. The method also includes suppressing the at least one interference signal in the at least one uplink band based on the at least one phase-synchronized uplink signal.

An additional embodiment of the disclosure relates to a WDS. The WDS includes a plurality of remote units. The WDS also includes an HEU coupled to the plurality of remote units via a plurality of communications media, respectively. The HEU is configured to distribute a plurality of downlink communications signals to the plurality of remote units via the plurality of communications media, respectively. The HEU is also configured to receive a plurality of uplink communications signals from the plurality of remote units via the plurality of communications media, respectively. The HEU includes a communication circuit. The communication circuit includes a transmit circuit configured to transmit at least one downlink communications signal in at least one downlink band. The communication circuit also includes a receive circuit configured to receive at least one uplink communications signal in at least one uplink band. The at least one uplink communications signal comprises at least one interference signal leaked from the transmit circuit to the receive circuit. The communication circuit also includes a signal processing circuit coupled to the transmit circuit and the receive circuit. The signal processing circuit is configured to receive the at least one downlink communications signal and the at least one uplink communications signal. The signal processing circuit is also configured to determine an anchor downlink signal based on the at least one downlink communications signal. The signal processing circuit is also configured to determine an anchor temporal term and an anchor phase term associated with the anchor downlink signal. The signal processing circuit is also configured to determine at least one optimal temporal term and at least one optimal phase term configured to suppress the at least one interference signal in the at least one uplink band. The signal processing circuit is also configured to generate at least one phase-synchronized uplink signal comprising the at least one uplink communications signal and having a linear phase shift defined by the anchor temporal term, the anchor phase term, the at least one optimal temporal term, and the at least one optimal phase term. The signal processing circuit is also configured to suppress the at least one interference signal in the at least one uplink band based on the at least one phase-synchronized uplink signal.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiments, and together with the description serve to explain principles and operation of the various embodiments.

DETAILED DESCRIPTION

Embodiments of the disclosure relate to a communication circuit in a wireless communications system (WCS), such as a wireless distribution system (WDS). In examples discussed herein, the WCS includes software-defined remote units configured to communicate downlink and uplink communications signals with a head-end unit (HEU) based on frequency-division duplex (FDD) and/or full-duplex (FDx) schemes. The WCS employs self-interference cancellation (SIC) circuitry to suppress an interference signal(s) associated with an uplink communications signal(s) in a target uplink band(s). In this regard, a communication circuit is employed (e.g., in the HEU) to provide more accurate temporal and phase estimates about the interference signal(s) in the target uplink band(s). More specifically, the communication circuit utilizes an anchor downlink signal, which can be any of the downlink communications signals communicated in the WCS, to help determine an optimal phase shift for an uplink communications signal(s) in the target uplink band(s). Accordingly, the SIC circuitry can suppress the interference signal(s) in the target uplink band(s) based on the optimal phase shift. By determining the optimal phase shift in the target uplink band(s), it is possible to achieve accurate temporal and phase synchronization in the SIC circuitry, thus helping to achieve higher and more stable interference suppression in the WCS.

Figure 1:
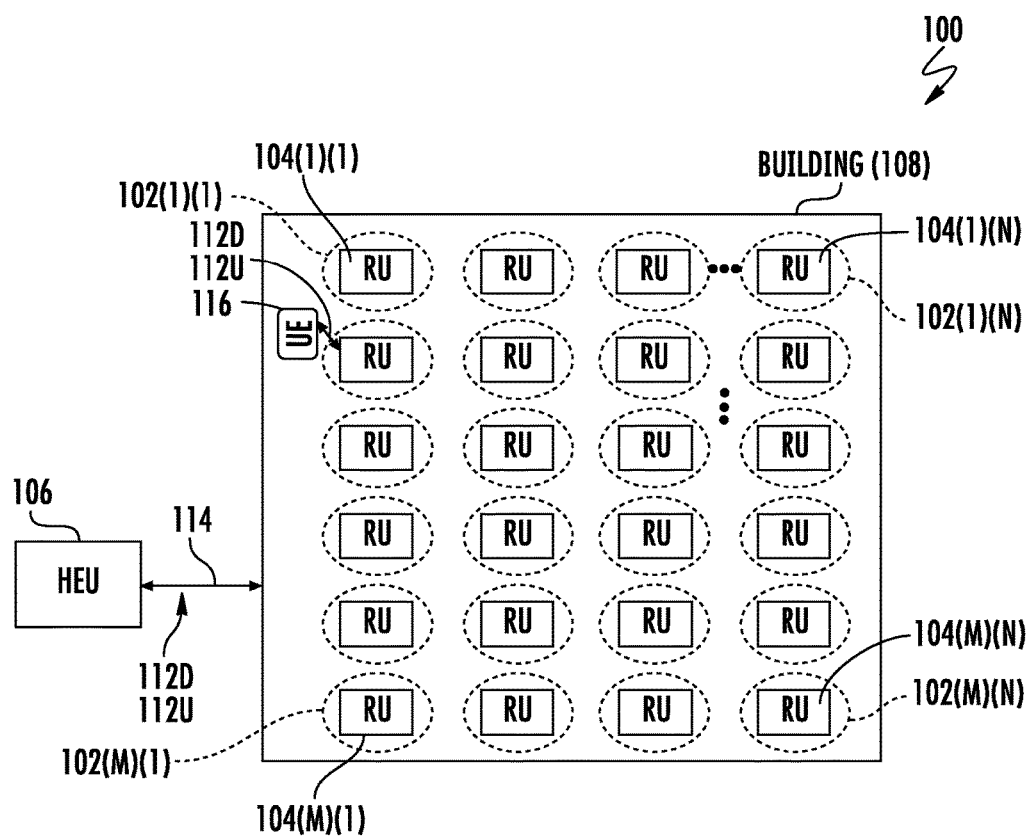
FIG. 1 is a schematic diagram of an exemplary indoor wireless distribution system (WDS)
Figure 2:
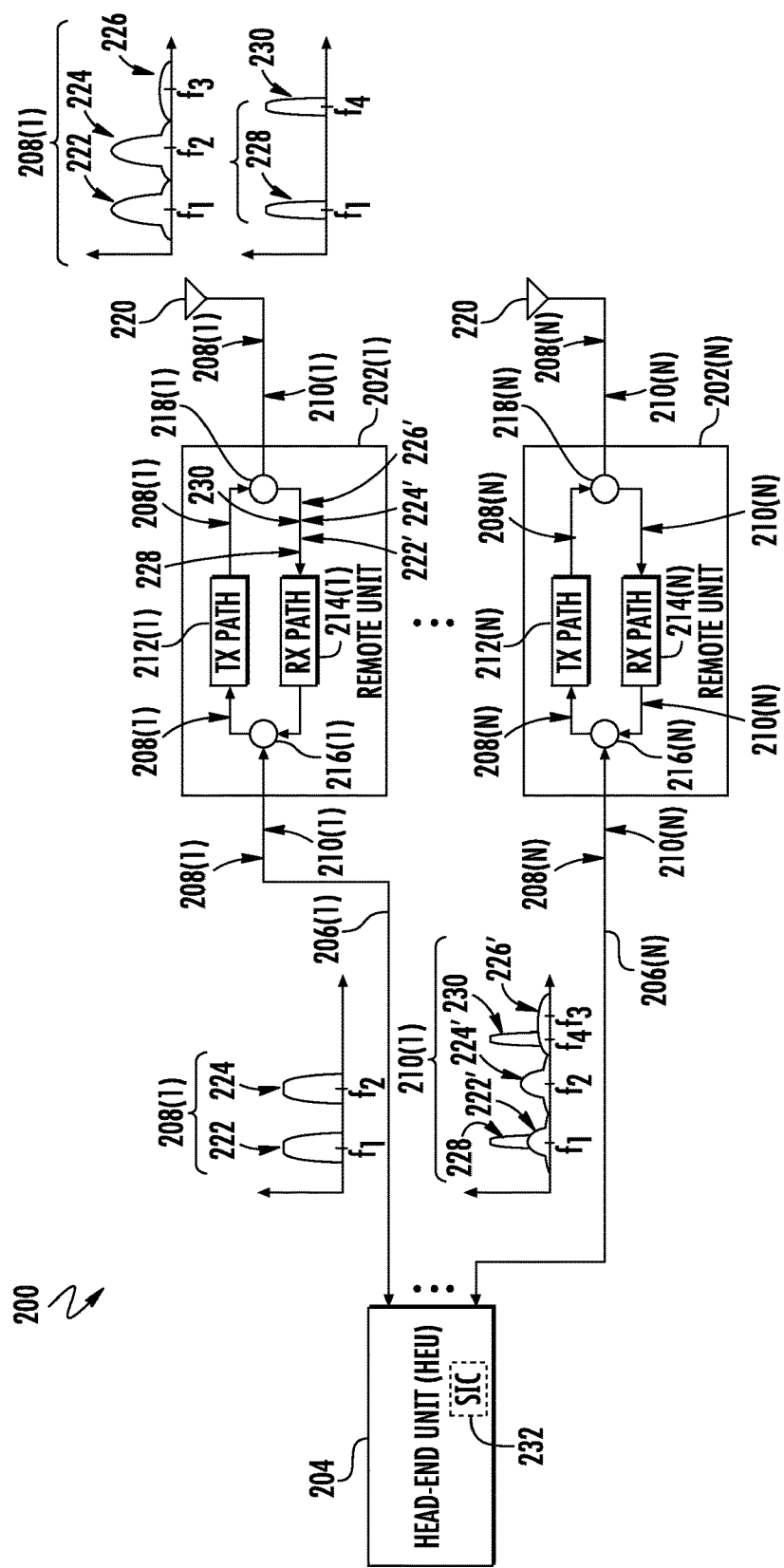
FIG. 2 is a schematic diagram of an exemplary WDS employing a plurality of software-defined remote units that can cause a downlink-to-uplink interference(s)

Before discussing a communication circuit configured to provide optimal synchronization for SIC in a WDS, a brief discussion of SIC and related synchronization issues in a WDS employing software-defined remote units is first provided with reference to FIG. 2. The discussion of specific exemplary aspects of a communication circuit, which can be provided in the WDS of FIG. 2 and configured to enable optimal synchronization for SIC starts below with reference to FIG. 3.

In this regard, FIG. 2 is a schematic diagram of an exemplary WDS 200 employing a plurality of software-defined remote units 202(1)-202(N) that can cause a downlink-to-uplink (DL-to-UL) interference(s). The WDS 200 includes an HEU 204. The HEU 204 is coupled to the software-defined remote units 202(1)-202(N) via a plurality of communications media 206(1)-206(N), which can optical fiber-based communications media, for example. The HEU 204 is configured to communicate a plurality of downlink communications signals 208(1)-208(N) to the software-defined remote units 202(1)-202(N) and receive a plurality of uplink communications signals 210(1)-210(N) from the software-defined remote units 202(1)-202(N). In a non-limiting example, each of the downlink communications signals 208(1)-208(N) can be communicated in a downlink band(s) based on FDD and/or FDx schemes. Likewise, each of the uplink communications signals 210(1)-210(N) can be communicated in an uplink band(s) based on FDD and/or FDx schemes. Notably, in the FDD scheme, the downlink band(s) and the uplink band(s) have different center frequencies. In contrast, in the FDx scheme, the downlink band(s) and the uplink band(s) have identical center frequencies.

The software-defined remote units 202(1)-202(N) include a plurality of transmit (TX) paths 212(1)-212(N), a plurality of receive (RX) paths 214(1)-214(N), a plurality of input duplexers 216(1)-216(N), and a plurality of output duplexers 218(1)-218(N). Each of the output duplexers 218(1)-218(N) is coupled to an antenna(s) 220. For the convenience of reference and illustration, the software-defined remote unit 202(1) is discussed hereinafter as a non-limiting example.

In the software-defined remote unit 202(1), the input duplexer 216(1) is coupled to the communications medium 206(1). In this regard, the input duplexer 216(1) receives the downlink communications signal 208(1) from the HEU 204. In a non-limiting example, the downlink communications signal 208(1) includes a pair of downlink signals 222 and 224. The downlink signal 222 is transmitted in a first downlink band having a center frequency $f_1$ based on the FDx scheme. The downlink signal 224 is transmitted in a second downlink band having a center frequency $f_2$ based on the FDD scheme. The TX path 212(1) may include a power amplifier(s) configured to amplify the downlink communications signal 208(1) and provide the amplified downlink communications signal 208(1) to the antenna(s) 220 for transmission. Notably, the power amplifier(s) in the TX path 212(1) may be inherently nonlinear. As a result, the power amplifier(s) can generate a third-order intermodulation distortion (IMD3) signal 226 in the downlink communications signal 208(1). The IMD3 signal 226 can have a center frequency $f_3$, which can equal $2f_2-f_1$, for example. The output duplexer 218(1) is configured to receive the amplified downlink communications signal 208(1) from the TX path 212(1) and provide the amplified downlink communications signal 208(1) to the antenna(s) 220 for transmission.

The output duplexer 218(1) is configured to receive the uplink communications signal 210(1) from the antenna(s) 220 and provides the uplink communications signal 210(1) to the RX path 214(1). In a non-limiting example, the uplink communications signal 210(1) includes a pair of uplink signals 228 and 230. The uplink signal 228 is received in a first uplink band also having the center frequency $f_1$ based on the FDx scheme. The uplink signal 230 is received in a second uplink band having a center frequency $f_4$ based on the FDD scheme. In examples discussed herein, the second uplink band overlaps at least partially with the IMD3 signal 226. The input duplexer 216(1) is configured to receive the uplink communications signal 210(1) from the RX path 214(1) and provide the uplink communications signal 210(1) to the HEU 204.

As previously discussed, the software-defined remote unit 202(1) can provide more flexibility with respect to spectrum utilization (e.g., band re-farming), system configuration, and/or software upgrade. However, such flexibility is achieved at the expense of increased in-band and/or out-of-band leakage. Notably, the software-defined remote unit 202(1) does not have hardware-based transmit and/or receive filter(s) to help suppress the in-band and/or out-of-band leakage, and the output duplexer 218(1) can only provide limited isolation between the TX path 212(1) and the RX path 214(1). As a result, at least a portion of the downlink signals 222 and 224 and the IMD3 signal 226 are leaked from the TX path 212(1) to the RX path 214(1) as leaked interference signals 222', 224', and 226', respectively. Although the leaked interference signals 222', 224', and 226' may have less power than the downlink signals 222 and 224 and the IMD3 signal 226, the leaked interference signals 222', 224', and 226' appear at the same center frequencies $f_1$, $f_2$, and $f_3$ as the downlink signals 222 and 224 and the IMD3 signal 226. In this regard, the leaked interference signal 222' represents an in-band leakage that interferes with the uplink signal 228 in the first uplink band. The leaked IMD3 signal 226', on the other hand, represents an out-of-band leakage that interferes with the uplink signal 230 in the second uplink band. Notably, the input duplexer 216(1) has very limited capability in suppressing the leaked interference signals 222', 224', and 226'. As a result, the uplink communications signal 210(1) received by the HEU 204 includes the uplink signals 228 and 230 as well as the leaked interference signals 222', 224', and 226'. The presence of the leaked interference signals 222', 224', and 226' in the uplink communications signal 210(1) can reduce the sensitivity (e.g., reducing signal-to-noise ratio) of receivers in the software-defined remote unit 202(1), thus degrading radio frequency (RF) performance (e.g., throughput and coverage range) of the software-defined remote unit 202(1) and the WDS 200 as a whole. Hence, it may be desirable to configured the WDS 200 and/or the software-defined remote unit 202(1) to provide maximum possible suppression of the leaked interference signals 222', 224', and 226'.

SIC is a widely adopted interference cancellation technique in wireless communications systems, particularly in FDx systems, to help suppress in-band interference signals. In a non-limiting example, the HEU 204 can be configured to include SIC circuitry 232 to suppress the in-band interference signals associated with each of the uplink communications signals 210(1)-210(N). The SIC circuitry 232 leverage the fact that the SIC circuitry 232 can learn from RF transceivers about the downlink communications signals 208(1)-208(N) being transmitted in the WDS 200. Accordingly, the SIC circuitry 232 can subtract the leaked interference signals 222', 224', and 226' from the uplink communications signal 210(1) by generating a processed copy of the downlink communications signal 208(1), which is also known as an interference offset signal. To cancel out the leaked interference signals 222', 224', and 226' in the uplink communications signal 210(1), the interference offset signal needs to include copies of the leaked interference signals 222', 224', and 226' in substantially similar amplitude and substantially opposing phase relative to the leaked interference signals 222', 224', and 226'. In this regard, the SIC circuitry 232 needs to accurately estimate temporal and phase terms for each of the leaked interference signals 222', 224', and 226' to maximize suppression of the leaked interference signals 222', 224', and 226'. As such, the SIC circuitry 232 needs to maintain precise synchronization between the downlink communications signal 208(1) and the uplink communications signal 210(1) to achieve a high-degree of interference cancellation.

However, since the SIC circuitry 232 may be provided in the HEU 204, it can lead to asynchronization and varying timing offsets from the software-defined remote unit 202(1). For example, in a WDS configured to communicate downlink and uplink signals based on a common public radio interface (CPRI) protocol, a round trip delay inaccuracy can be as large as ±16 nanoseconds (ns), which can limit an in-band interference cancellation ratio to below 6 decibels (dB) for a 20 megahertz (MHz) Long Term Evolution (LTE) Advanced (A) (LTE-A) signal. Hence, it is desired to improve the in-band interference cancellation ratio by enabling the SIC circuitry 232 to perform more accurate timing and phase estimates about the leaked interference signals 222', 224', and 226' in the uplink communications signal 210(1).

Figure 3:
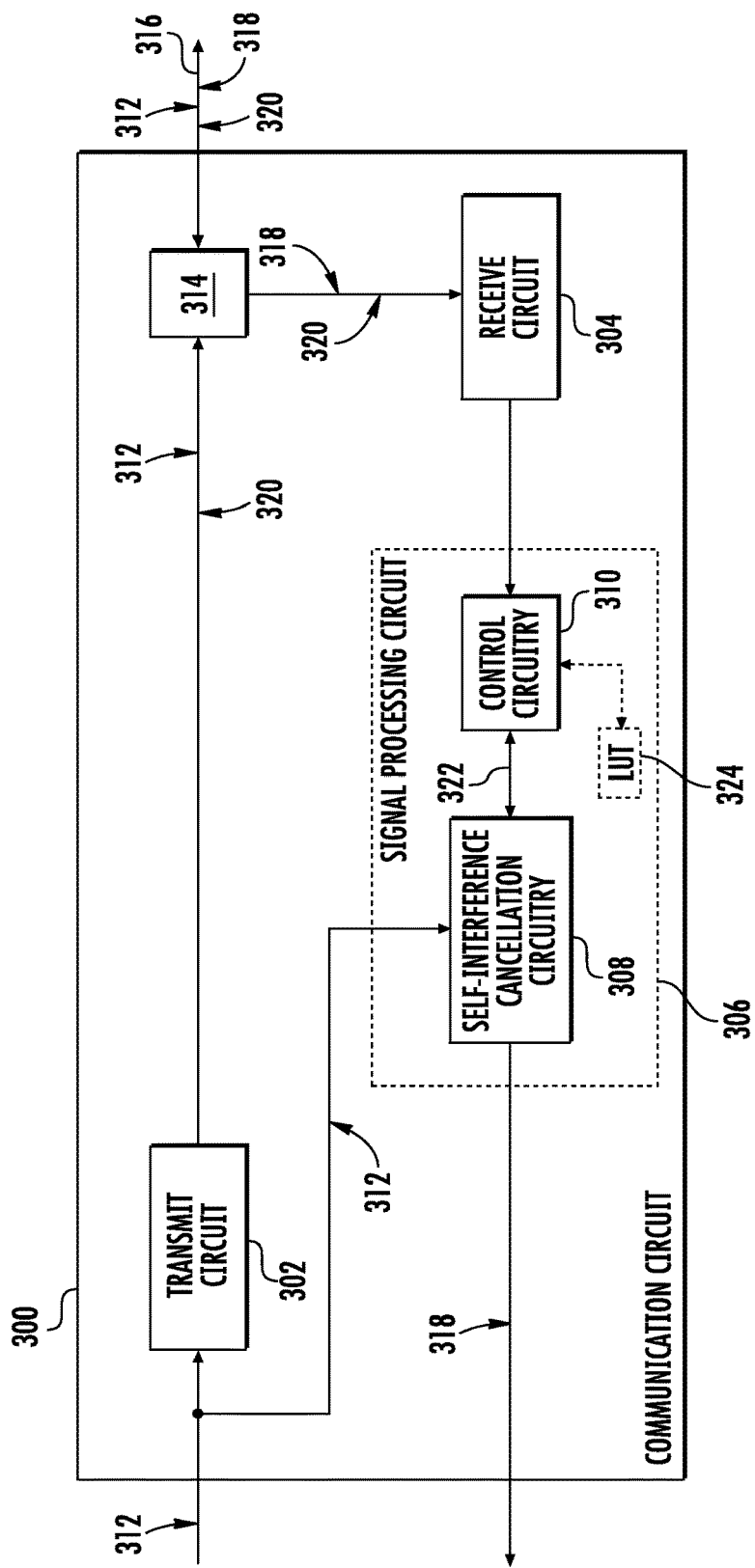
FIG. 3 is a schematic diagram of an exemplary communication circuit, which can be provided in the WDS of FIG. 2 and configured to enable optimal synchronization for self-interference cancellation (SIC)

In this regard, FIG. 3 is a schematic diagram of an exemplary communication circuit 300, which can be provided in the WDS 200 of FIG. 2 and configured to enable optimal synchronization for SIC. As discussed below in detail, the communication circuit 300 is employed (e.g., in the HEU 204 of FIG. 2) to provide more accurate temporal and phase estimates about an interference signal in a target uplink band. More specifically, the communication circuit 300 utilizes an anchor downlink signal, which can be any of the downlink communications signals 208(1)-208(N) in FIG. 2, to help determine an optimal phase shift for an uplink communications signal(s) (e.g., the uplink communications signal 210(1) of FIG. 2) in the target uplink band(s) (e.g., the first uplink band at the center frequency $f_1$ and the second uplink band at the center frequency $f_4$ as shown in FIG. 2). Accordingly, the communication circuit 300 can suppress the interference signal(s) in the target uplink band(s) based on the optimal phase shift. By determining the optimal phase shift in the target uplink band(s), it is possible to achieve accurate temporal and phase synchronization for SIC, thus helping to achieve higher and more stable interference suppression in a wireless communications system (e.g., the WDS 200 of FIG. 2).

The communication circuit 300 includes a transmit circuit 302, a receive circuit 304, and a signal processing circuit 306. The signal processing circuit 306 includes SIC circuitry 308 and control circuitry 310. In a non-limiting example, the control circuitry 310 can be a microprocessor, a general-purpose processor, a digital signal processor (DSP), or a field-programmable gate array (FPGA). The SIC circuitry 308 and the control circuitry 310 may be provided as separate circuitries or integrated into a single circuit.

The transmit circuit 302 is configured to receive at least one downlink communications signal 312, which can include one or more of the downlink communications signals 208(1)-208(N) of FIG. 2. The transmit circuit 302 is coupled to duplexer circuitry 314. The duplexer circuitry 314 is coupled to at least one communications medium 316, which can include one or more of the communications media 206(1)-206(N) of FIG. 2. In this regard, the duplexer circuitry 314 can couple the transmit circuit 302 to the communications medium 316 for transmitting the downlink communications signal 312 in at least one downlink band. The communications medium 316 can be coupled to one or more of the software-defined remote units 202(1)-202(N) of FIG. 2. In this regard, the software-defined remote units 202(1)-202(N) of FIG. 2 receive the downlink communications signal 312 for transmission to respective client devices.

The communications medium 316 is also configured to receive at least one uplink communications signal 318, which can include one or more of the uplink communications signals 210(1)-210(N) of FIG. 2, in at least one uplink band from the software-defined remote units 202(1)-202(N) and provide the uplink communications signal 318 to the duplexer circuitry 314. The duplexer circuitry 314 can also couple the receive circuit 304 to the communications medium 316 to receive the uplink communications signal 318.

The transmit circuit 302 can include a power amplifier(s) to amplify the downlink communications signal 312. As such, the transmit circuit 302 can generate at least one interference signal 320 as a result of the inherent nonlinearity of the power amplifier(s). The duplexer circuitry 314, on the other hand, may not be able to provide sufficient separation between the transmit circuit 302 and the receive circuit 304. As a result, the interference signal 320 can be leaked from the transmit circuit 302 to the receive circuit 304. In this regard, the receive circuit 304 receives the interference signal 320 as part of the uplink communications signal 318.

The SIC circuitry 308 receives the downlink communications signal 312. The control circuitry 310 receives the uplink communications signal 318 and the interference signal 320 from the receive circuit 304. The uplink communications signal 318, which can be denoted as $S_{UL}(\omega)$ in frequency domain, may be out of sync from the downlink communications signal 312 due to processing delays introduced at the software-defined remote units 202(1)-202(N) and/or a propagation delay introduced by the communications medium 316. As such, to maximize interference suppression at the SIC circuitry 308, the control circuitry 310 needs to manipulate or regenerate the uplink communications signal 318 to compensate for the propagation delay and, thus, achieving accurate synchronization with the downlink communications signal 312. In this regard, the control circuitry 310 generates at least one phase-synchronized uplink signal 322. The phase-synchronized uplink signal 322, which can be denoted as $S_{UL}(\omega)\exp(T_{UL}\omega+\varphi_{UL})$ in frequency domain, for the uplink band, is generated by providing a linear phase shift $\tau_{UL}\omega+\varphi_{UL}$ to the uplink communications signal 318. The linear phase shift $\tau_{UL}\omega+\varphi_{UL}$ is defined by a temporal term $\tau_{UL}$ and a phase term $\varphi_{UL}$ so determined to achieve accurate synchronization with the downlink communications signal 312.

To determine the linear phase shift $T_{UL}\omega+\varphi_{UL}$, the control circuitry 310 first determines an anchor downlink signal based on the downlink communications signal 312. The control circuitry 310 is aware of a transmit phase and a frequency $\omega$ of the anchor downlink signal. Further, the control circuitry 310 can measure a return phase of the anchor downlink signal when the anchor downlink signal returns to the control circuitry 310 after a round trip to one of the software-defined remote units 202(1)-202(N). Accordingly, the control circuitry 310 can determine an anchor phase response $\varphi_{Anchor}$, which corresponds to a phase differential between the transmit phase and the return, of the anchor downlink signal. With knowledge of the frequency $\omega$ of the anchor downlink signal and the anchor phase response $\varphi_{Anchor}$, the control circuitry 310 can perform linear regression based on a linear regression equation (Eq. 1) below to determine an anchor temporal term TA and an anchor phase term φA of the anchor downlink signal.

$$\varphi_{Anchor} = \tau_A \omega + \varphi_A \quad \text{(Eq. 1)}$$

The control circuitry 310 further determines at least one optimal temporal term T and at least one optimal phase term φ. As discussed in detail with reference to FIG. 5, the optimal temporal term T and the optimal phase term φ can be predetermined to suppress the interference signal 320 in the uplink band through a calibration procedure and stored in a lookup table (LUT) 324. As such, the control circuitry 310 can retrieve the optimal temporal term T and the optimal phase term φ from the LUT 324 for any target uplink band. In this regard, the control circuitry 310 can determine the temporal term $\tau_{UL}$ based on the anchor temporal term $\tau_A$ and the optimal term T and determine the phase term $\varphi_{UL}$ based on the anchor phase term $\varphi_A$ and the optimal phase term φ. A specific example for determining the linear phase shift $\tau_{UL}\omega+\varphi_{UL}$ is also provided later in the discussion of FIG. 5.

The control circuitry 310 provides the phase-synchronized uplink signal 322 to the SIC circuitry 308, which in turn suppresses the interference signal 320 based on the phase-synchronized uplink signal 322 and the downlink communications signal 312. In this regard, the SIC circuitry 308 outputs the uplink communications signal 318 after suppressing or removing the interference signal 320. In this regard, the communication circuit 300 can provide more accurate synchronization for the SIC circuitry 308, thus helping to achieve higher and more stable interference suppression, independent of any specific SIC algorithm employed by the SIC circuitry 308.

Figure 4:
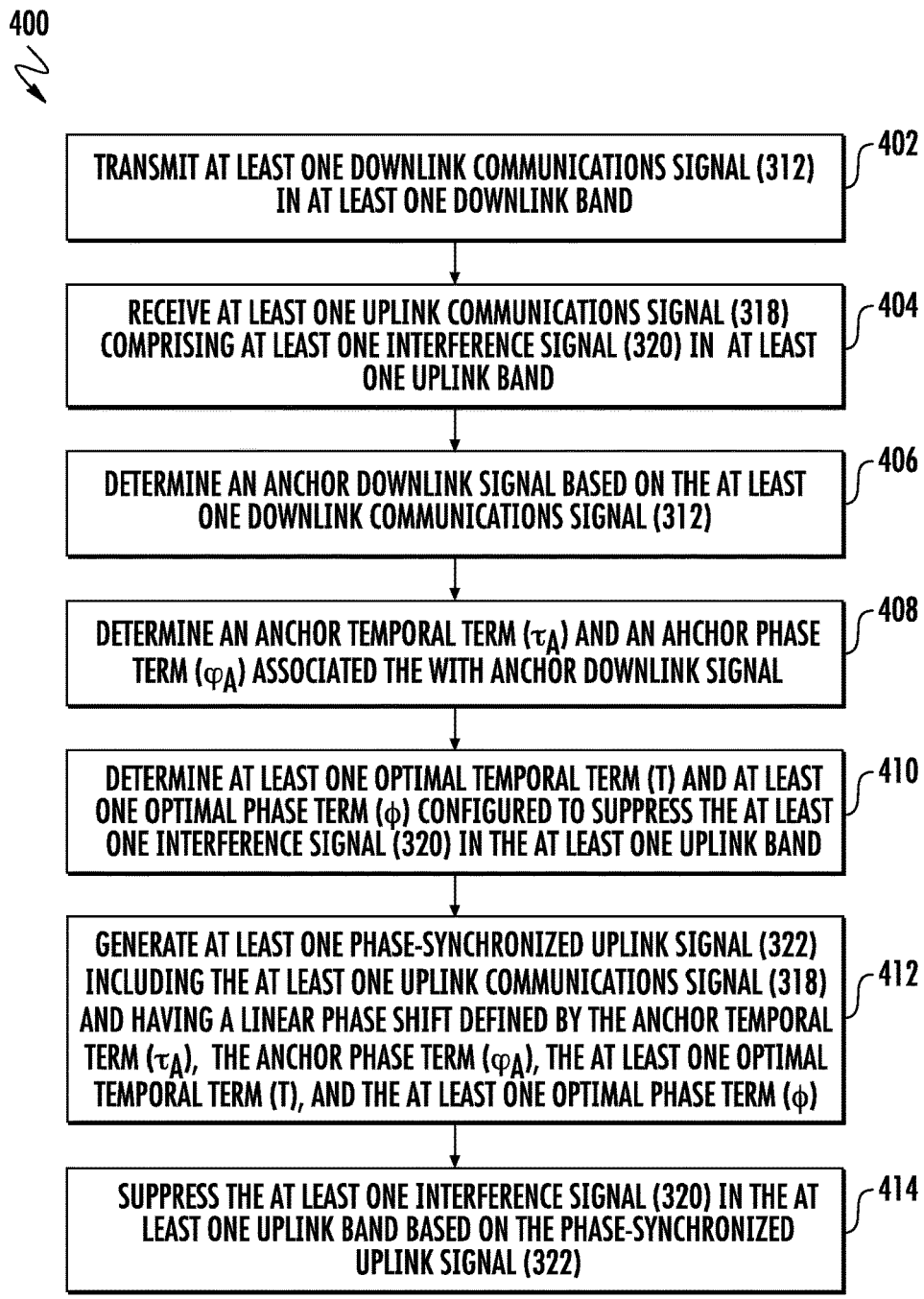
FIG. 4 is a flowchart of an exemplary process which can be employed by the communication circuit of FIG. 3 to enable optimal synchronization for SIC in a WDS.

The communication circuit 300 can be configured to enable optimal synchronization for SIC in a WDS based on a process. In this regard, FIG. 4 is a flowchart of an exemplary process 400 which can be employed by the communication circuit 300 of FIG. 3 to enable optimal synchronization for SIC in a WDS.

According to the process 400, the transmit circuit 302 transmits the downlink communications signal 312 in the downlink band (block 402). The receive circuit 304 receives the uplink communications signal 318, which includes the interference signal 320, in the uplink band (block 404). The control circuitry 310 determines the anchor downlink signal based on the downlink communications signal 312 (block 406). The control circuitry 310 determines the anchor temporal term $\tau_A$ and the anchor phase term $\varphi_A$ associated with the anchor downlink signal (block 408). The control circuitry 310 determines the optimal temporal term T and the optimal phase term φ configured to suppress the interference signal 320 in the uplink band (block 410). The control circuitry 310 generates the phase-synchronized uplink signal 322, including the uplink communications signal 318 and having the linear phase shift $\tau_{UL}\omega+\varphi_{UL}$ defined by the anchor temporal term TA, the anchor phase term $\varphi_A$, the optimal temporal term T, and the optimal phase term φ (block 412). The SIC circuitry 308 suppresses the interference signal 320 in the uplink band based on the phase-synchronized uplink signal 322 (block 414).

Figure 5:
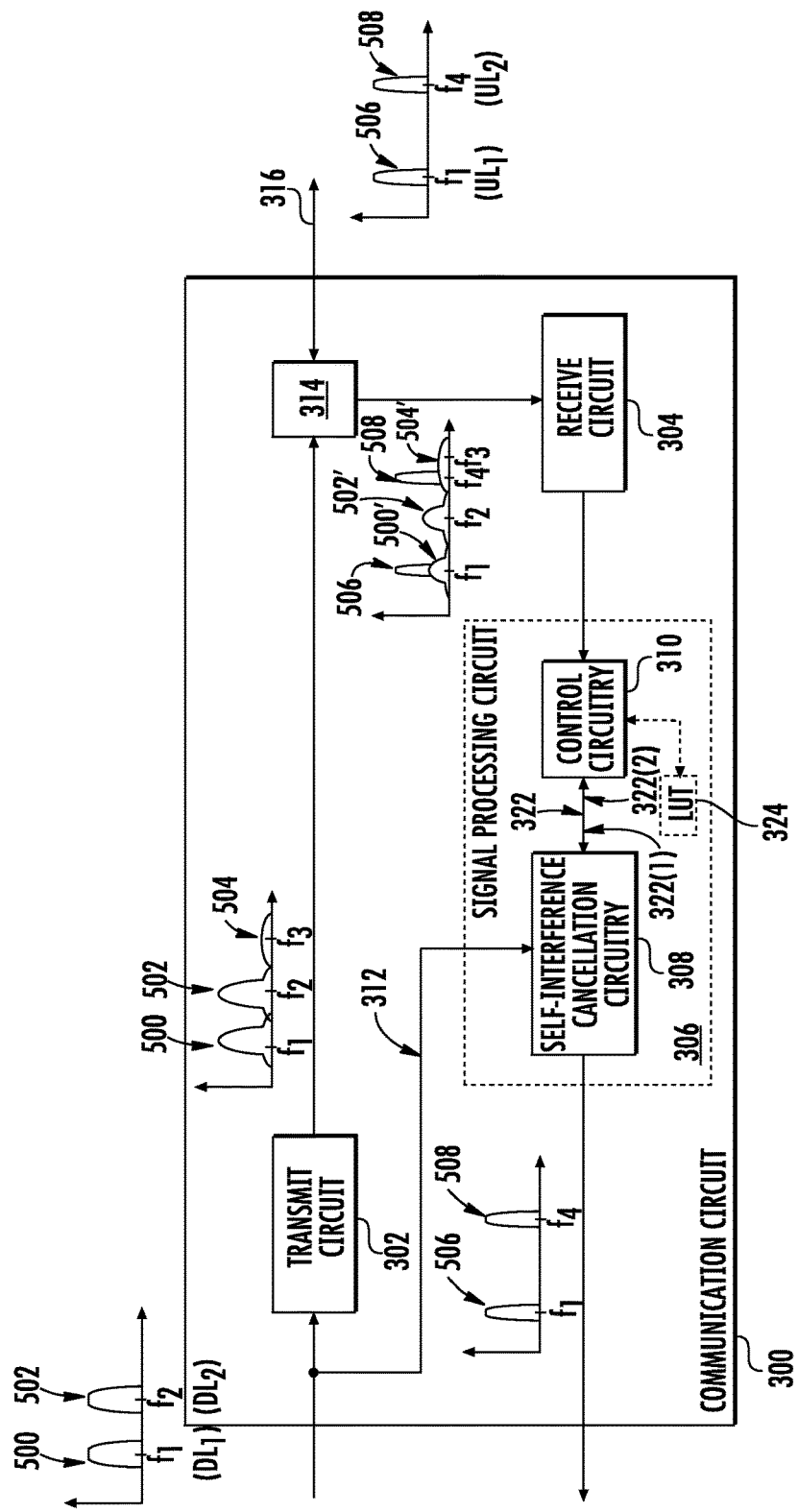
FIG. 5 is a schematic diagram providing an exemplary illustration of the communication circuit of FIG. 3 configured to enable optimal synchronization for SIC according to one embodiment of the present disclosure.

A specific non-limiting example of the communication circuit 300 of FIG. 3 configured to enable optimal synchronization for SIC in a WDS is now discussed with reference to FIG. 5. In this regard, FIG. 5 is a schematic diagram providing an exemplary illustration of the communication circuit 300 of FIG. 3 configured to enable optimal synchronization for SIC according to one embodiment of the present disclosure. Common elements between FIGS. 3 and 5 are shown therein with common element numbers and will not be re-described herein.

The communication circuit 300 can be provided in the HEU 204 in the WDS 200 of FIG. 2. As discussed in FIG. 2, the HEU 204 is configured to communicate the downlink communications signals 208(1)-208(N) and the uplink communications signals 210(1)-210(N) with the software-defined remote units 202(1)-202(N). In this regard, the communication circuit 300 is configured to maximize in-band and/or out-of-band leakage suppression in all of the uplink communications signals 210(1)-210(N). For the sake of simplicity, the communication circuit 300 is discussed with reference to downlink and uplink communications signals communicated between the HEU 204 and the software-defined remote unit 202(1). It should be appreciated that functionalities and operational principles of the communication circuit 300 discussed herein are generally applicable to in-band and/or out-of-band leakage suppression in all of the uplink communications signals 210(1)-210(N).

In a non-limiting example, the transmit circuit 302 is configured to transmit a first downlink communications signal 500 in a first downlink band $DL_1$ based on the FDx scheme. The first downlink band $DL_1$ corresponds to a center frequency $f_1$. The transmit circuit 302 is also configured to transmit a second downlink communications signal 502 in a second downlink band $DL_2$ based on the FDD scheme. The second downlink band $DL_2$ corresponds to a center frequency $f_2$.

The transmit circuit 302 includes a power amplifier(s) configured to amplify the first downlink communications signal 500 and the second downlink communications signal 502. Due to the inherent nonlinearity of the power amplifier(s), the transmit circuit 302 outputs an IMD3 signal 504 in association with the first downlink communications signal 500 and the second downlink communications signal 502. The IMD3 signal 504 has a center frequency $f_3$, which can equal to $2f_2-f_1$ or $2f_1-f_2$, for example. The duplexer circuitry 314 couples the transmit circuit 302 to the communications medium 316 to communicate the first downlink communications signal 500, the second downlink communications signal 502, and the IMD3 signal 504 to the software-defined remote unit 202(1).

The software-defined remote unit 202(1) communicates a first uplink communications signal 506, which can be denoted as $S_{UL1}(\omega)$ in frequency domain, in a first uplink band $UL_1$ based on the FDx scheme. As such, the first uplink band $UL_1$ also has the center frequency $f_1$. The software-defined remote unit 202(1) also communicates a second uplink communications signal 508, which can be denoted as $S_{UL2}(\omega)$ in frequency domain, in a second uplink band $UL_2$ based on the FDD scheme. The second uplink band $UL_2$ has a center frequency $f_4$. In this non-limiting example, the relationship between the center frequencies $f_1$, $f_2$, $f_3$, and $f_4$ can be expressed as $f_1<f_2<f_4<f_3$.

As previously discussed with reference to FIG. 3, the duplexer circuitry 314 may not be able to provide in-band and/or out-of-band leakage suppression between the transmit circuit 302 and the receive circuit 304. As a result, the first downlink communications signal 500, the second downlink communications signal 502, and the IMD3 signal 504 can be leaked from the transmit circuit 302 and appear at the receive circuit 304 as interference signals 500', 502', and 504', respectively. In this example, the interference signal 500' is referred to as a first interference signal, while the interference signals 502' and 504' are collectively referred to as a second interference signal.

In this regard, the receive circuit 304 receives the first uplink communications signal 506 and the first interference signal (corresponding to the interference signal 500') in the first uplink band $UL_1$. The receive circuit 304 also receives the second uplink communications signal 508 and a portion of the second interference signal (corresponding to the interference signal 504') in the second uplink band $UL_2$. In addition, the receive circuit 304 also receives another portion of the second interference signal (corresponding to the interference signal 502') between the first uplink band $UL_1$ and the second uplink band $UL_2$.

The control circuitry 310 receives the first uplink communications signal 506, the second uplink communications signal 508, and the interference signals 500', 502', and 504' from the receive circuit 304. The control circuitry 310 first determines an anchor downlink signal among the first downlink communications signal 500 and the second downlink communications signal 502. In a non-limiting example, the control circuitry 310 can determine the anchor downlink signal as being the downlink communications signal having a strongest root-mean-square (RMS) power among the first downlink communications signal 500 and the second downlink communications signal 502.

Next, the control circuitry 310 determines the anchor phase response $\varphi_{Anchor}$ as previously described with reference to FIG. 3. Based on the anchor phase response $\varphi_{Anchor}$, the control circuitry 310 can perform linear regression using the linear regression equation (Eq. 1) to determine the anchor temporal term TA and the anchor phase term $\varphi_A$ associated with the anchor downlink signal. The control circuitry 310 retrieves an optimal anchor temporal term TA and an optimal anchor phase term $\phi A$ from the LUT 324 based on the anchor band, which can be either the first downlink band $DL_1$ or the second downlink band $DL_2$ depending which of the first downlink communications signal 500 and the second downlink communications signal 502 is chosen to be the anchor downlink signal. The control circuitry 310 also retrieves a first optimal uplink temporal term $T_{UL1}$ and a first optimal uplink phase term $\phi_{UL1}$ from the LUT 324 based on the first uplink band $UL_1$. The content of the LUT 324 can be predetermined through a calibration procedure, which will be discussed later in detail.

The control circuitry 310 then generates a first phase-synchronized uplink signal 322(1), which can be denoted as $S_{UL1}(\omega)\exp(\tau_{UL1}+\varphi_{UL1})$ in frequency domain. The first phase-synchronized uplink signal 322(1) has a first linear phase shift $\tau_{UL1}\omega+\varphi_{UL1}$ defined by a first temporal term $T_{UL1}$ and a first phase term $\varphi_{UL1}$. The first temporal term $T_{UL1}$ and the first phase term $\varphi_{UL1}$ can be determined based on equation (Eq. 2) below.

$$\tau_{UL1}=-\tau_A+T_{UL1}-T_{UA}$$

$$\varphi_{UL1}=-\varphi_A+\phi_{UL1}-\phi_A \quad \text{(Eq. 2)}$$

Subsequently, the control circuitry 310 provides the first phase-synchronized uplink signal 322(1) to the SIC circuitry 308. The SIC circuitry 308 suppresses the first interference signal, which corresponds to the interference signal 500', based on the first phase-synchronized uplink signal 322(1).

The control circuitry 310 repeats the above procedure to generate a second phase-synchronized uplink signal 322(2) such that the SIC circuitry 308 can suppress the second interference signal, which corresponds to the interference signals 502' and 504', in the second uplink band $UL_2$. More specifically, the control circuitry 310 also retrieves a second optimal uplink temporal term $\tau_{UL2}$ and a second optimal uplink phase term $\phi_{UL2}$ from the LUT 324 based on the first uplink band $UL_1$. The control circuitry 310 then generates the second phase-synchronized uplink signal 322(2), which can be denoted as $S_{UL2}(\omega)\exp(\tau_{UL2}\omega+\varphi_{UL2})$ in frequency domain. The second phase-synchronized uplink signal 322 (2) has a second linear phase shift $\tau_{UL2}\omega+\varphi_{UL2}$ defined by a second temporal term $\tau_{UL2}$ and a second phase term $\phi_{UL2}$. The second temporal term rum, and the second phase term $\varphi_{UL2}$ can be determined based on equation (Eq. 3) below.

$$\tau_{UL2}=-\tau_A+T_{UL2}-T_{UA}$$

$$\varphi_{UL2}=-\varphi_A+\phi_{UL2}-\phi_A \quad \text{(Eq. 3)}$$

Subsequently, the control circuitry 310 provides the second phase-synchronized uplink signal 322(2) to the SIC circuitry 308. The SIC circuitry 308 suppresses the second interference signal, which corresponds to the interference signals 502' and 504', based on the second phase-synchronized uplink signal 322(2). After suppressing the first interference signal and the second interference signal, the SIC circuitry 308 outputs the first uplink communications signal 506 and the second uplink communications signal 508 in the first uplink band $UL_1$ and the second uplink band $UL_2$, respectively. Further, by repeating the procedures described above, the communication circuit 300 can suppress in-band and/or out-of-band interference associated with any of the uplink communications signals 210(1)-210(N) received from any of the software-defined remote units 202(1)-202(N).

The control circuitry 310 can be configured to operate in a calibration mode to populate the LUT 324. In the calibration mode, the transmit circuit 302 is configured to transmit the first downlink communications signal 500 and the second downlink communications signal 502 concurrently in the first downlink band $DL_1$ and the second downlink band $DL_2$, respectively. The duplexer circuitry 314 may be decoupled from the communications medium 316 in the calibration mode. In this regard, the duplexer circuitry 314 will not receive the first uplink communications signal 506 and the second uplink communications signal 508. As a result, the receive circuit 304 only receives the interference signals 500', 502', and 504' that are leaked from the transmit circuit 302. As such, each of the interference signals 500', 502', and 504' can be referred to as a returned interference signal and denoted as $S_{RET}(\omega)$ in frequency domain. In this non-limiting example, the receive circuit 304 receives three returned interference signals in a frequency spectrum extending from a lower boundary of the first uplink band $UL_1$ to an upper boundary of the second uplink band $UL_2$.

For each of the three returned interference signals, the control circuitry 310 is configured to phase shift the returned interference signals to generate a plurality of phase-shifted reference signals each associated with a respective temporal term and a respective phase term. The control circuitry 310 provides the phase-shifted reference signals to the SIC circuitry 308. The SIC circuitry 308, in turn, suppresses the returned interference signals to a plurality of suppression levels based on the phase-shifted reference signals. The control circuitry 310 receives the suppression levels from the SIC circuitry 308 and determines a maximum suppression level among the suppression levels received from the SIC circuitry 308. The control circuitry 310 then determines an optimal phase-shifted reference signal among the phase-shifted reference signals provided to the SIC circuitry 308 that causes the returned interference signal to be suppressed to the maximum suppression level in any of the downlink and uplink bands. Subsequently, the control circuitry 310 records the respective temporal term and the respective phase term of the optimal phase-shifted reference signal in the LUT 324 in association with corresponding downlink and/or uplink bands.

In this non-limiting example, the control circuitry 310 can populate the LUT 324 as shown below in the calibration mode.

| Lookup Table (324) | | |
|---|---|---|
| Band Number | Optimal Temporal Term (T) | Optimal Phase Term (φ) |
| $DL_1$ | $T_{DL1}$ | $\phi_{DL1}$ |
| $DL_2$ | $T_{DL2}$ | $\phi_{DL2}$ |
| $UL_1$ | $T_{UL1}$ | $\phi_{UL1}$ |
| $UL_2$ | $T_{UL2}$ | $\phi_{UL2}$ |

By repeating the calibration procedure as described above, the control circuitry 310 can populate corresponding optimal temporal terms and optimal phase terms for any downlink and uplink bands associated with any of the downlink communications signals 208(1)-208(N) and any of the uplink communications signals 210(1)-210(N).

Figure 6:
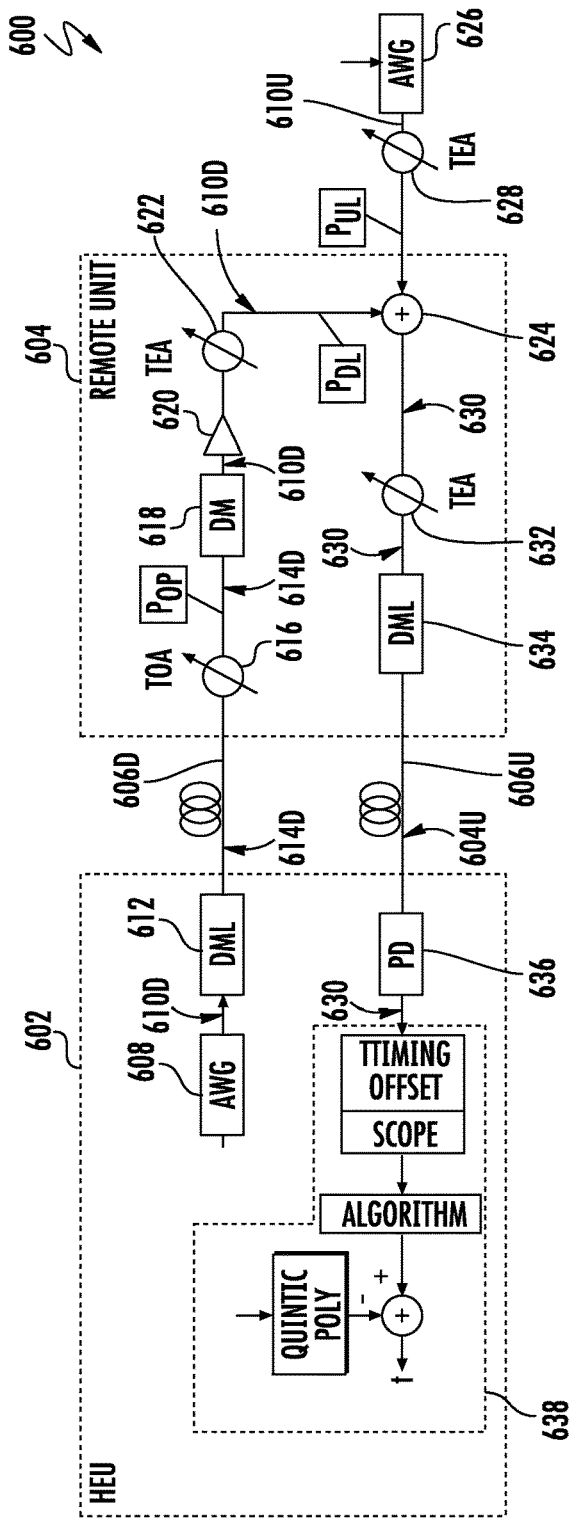
FIG. 6 is a schematic diagram of an exemplary test system configured to verify performance of the communication circuit of FIGS. 3 and 5 with respect to enabling optimal synchronization for SIC.

Performance of the communication circuit 300 of FIGS. 3 and 5 can be verified based on a test system as described next. In this regard, FIG. 6 is a schematic diagram of an exemplary test system 600 configured to verify performance of the communication circuit 300 of FIGS. 3 and 5 with respect to enabling optimal synchronization for SIC.

The test system 600 includes an HEU 602 and a software-defined remote unit 604. The HEU 602 is coupled to the software-defined remote unit 604 by a downlink fiber optical cable 606D and an uplink optical cable 606U. In the test system 600, the downlink fiber optical cable 606D and the uplink optical cable 606U are each two hundred meters (200 m) in length. The HEU 602 includes an arbitrary waveform generator (AWG) 608 configured to generate a software-defined radio (SDR) downlink signal 610D modulated in an LTE-like format in a downlink band $B_{DL}$ having a center frequency at 781 MHz and a 20 MHz bandwidth. The SDR downlink signal 610D is provided to a 10 gigahertz (GHz) direct modulation laser (DML) 612 at a 1550 nanometer (nm) wavelength. The DML 612 converts the SDR downlink signal 610D into an optical SDR downlink signal 614D for transmission to the software-defined remote unit 604 over the downlink fiber optical cable 606D.

The software-defined remote unit 604 includes a tunable optical attenuator (TOA) 616 configured to control optical power of the optical SDR downlink signal 614D to a power level $P_{op}$ and induce different nonlinearity in the optical SDR downlink signal 614D. A photodetector (PD) 618 is configured to convert the optical SDR downlink signal 614D back to the SDR downlink signal 610D. A 3 GHz low noise amplifier (LNA) 620, which has a 25 decibel-milliwatt (dBm) output third-order intercept point (IP3) and a 1 dB compression point, is configured to provide a 32 dB gain in the SDR downlink signal 610D. The SDR downlink signal 610D is subsequently attenuated by a downlink tunable electrical attenuator (TEA) 622 to a power level $P_{DL}$ before being received by a power combiner 624. In the test system 600, the power combiner 624 is employed to emulate the duplexer circuitry 314 in FIGS. 3 and 5.

The software-defined remote unit 604 is coupled to a second AWG 626 configured to generate an SDR uplink signal 610U in an uplink band $B_{UL}$ having a center frequency at 760 MHz and a 20 MHz bandwidth. An uplink TEA 628 is configured to attenuate the SDR uplink signal 610U to a power level $P_{UL}$ prior to providing the SDR uplink signal 610U to the power combiner 624. The power combiner 624 combines the SDR downlink signal 610D and the SDR uplink signal 610U to generate a combined SDR uplink signal 630, in which the SDR downlink signal 610D represents an interference signal leaked from the downlink band $B_{DL}$ into the uplink band $B_{UL}$. The combined SDR uplink signal 630 is attenuated by a second uplink TEA 632. An uplink DML 634 converts the combined SDR uplink signal 630 into an optical SDR uplink signal 614U for transmission to the HEU 602 over the uplink optical cable 606U. The HEU includes an uplink PD 636 configured to convert the optical SDR uplink signal 614U back to the combined SDR uplink signal 630. The combined SDR uplink signal 630 is received by a signal processing circuit 638, which is configured to be functionally equivalent to the signal processing circuit 306 if FIGS. 3 and 5.

During the calibration procedure to populate the LUT 324 of FIGS. 3 and 5, the signal processing circuit 638 implements quantic polynomial modeling to represent the nonlinearity of the test system 600, which leads to out-of-band leakage in the combined SDR uplink signal 630. After populating the LUT 324 in the calibration mode, the signal processing circuit 638 operates according to the process 400 of FIG. 4 and in accordance with the exemplary procedures as described with reference to FIGS. 3 and 5.

FIGS. 7A-7I are graphic plots providing exemplary illustrations of various test results obtained through the test system 600 of FIG. 6. Elements of FIG. 6 are referenced in connection with FIGS. 7A-7I and will not be re-described herein.

Figure 7A:
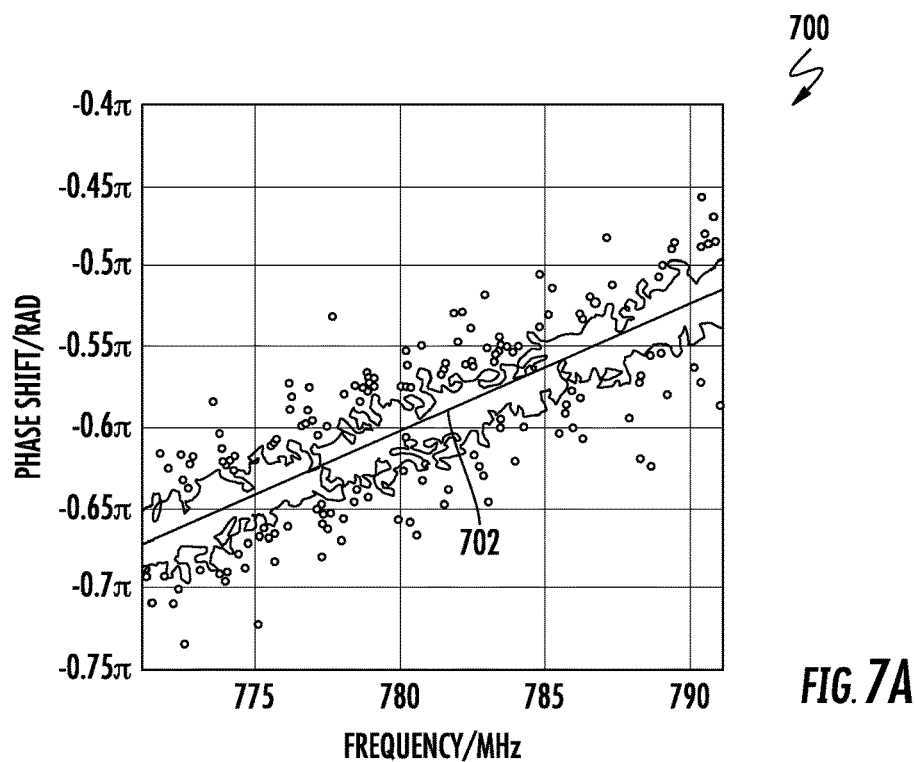
FIGS. 7A-7I are graphic plots providing exemplary illustrations of various test results obtained through the test system of FIG. 6.

FIG. 7A is a graphic plot 700 providing an exemplary illustration of phase samples and corresponding linear regression over an anchor band, such as the downlink band $B_{DL}$. In a non-limiting example, a linear regression curve 702 defines the linear regression equation (Eq. 1). The linear regression curve 702 can be used to further derive the anchor phase term (phase slope) $\varphi_A$ and the anchor temporal term TA over the downlink band $B_{DL}$ and the uplink band $B_{UL}$.

Figure 7B:
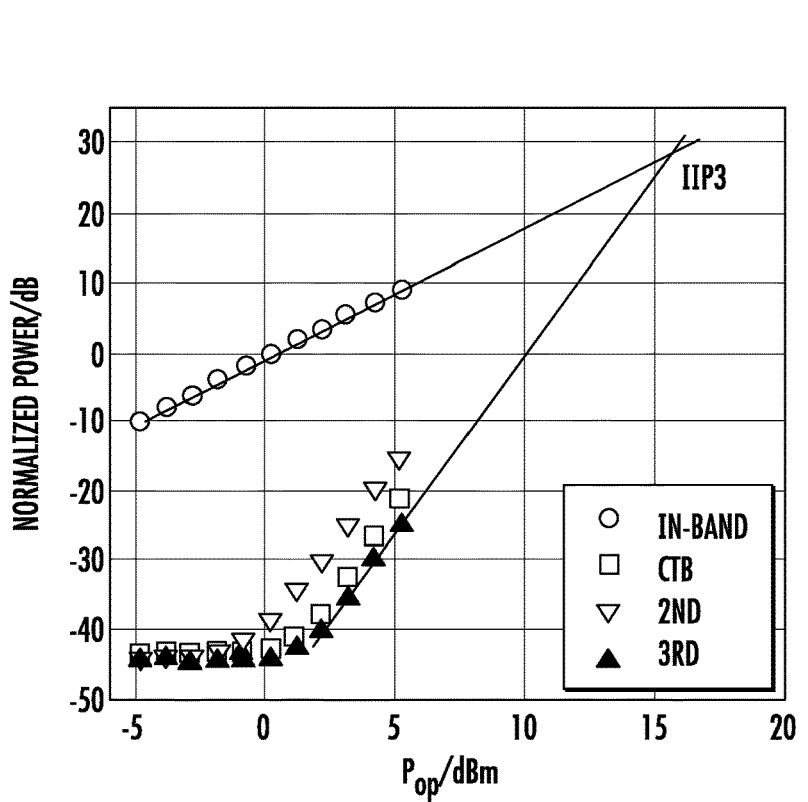

FIG. 7B is a graphic plot 704 providing an exemplary illustration of normalized power of an in-band signal and harmonics under various optical power $P_{op}$ values. As shown in FIG. 7B, the normalized power of different harmonics increases as the optical power $P_{op}$ is increased.

Figure 7E:
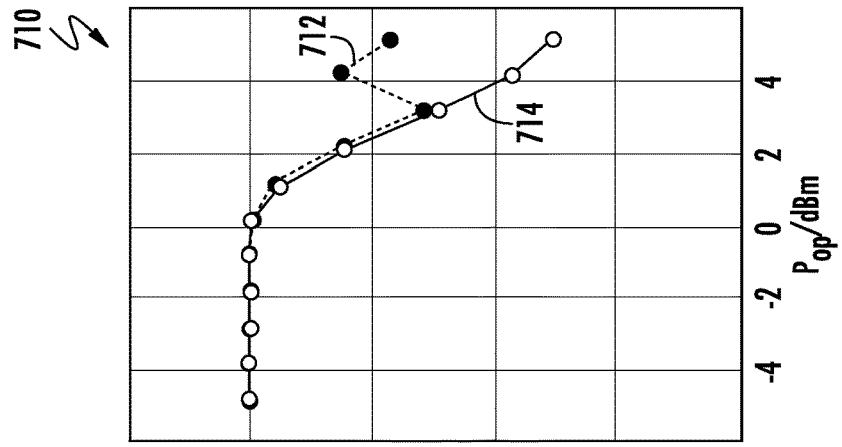
Figure 7D:
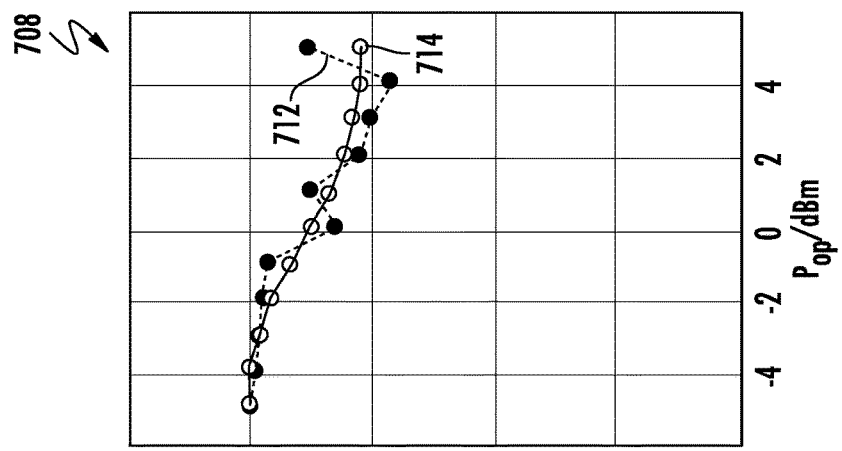
Figure 7C:
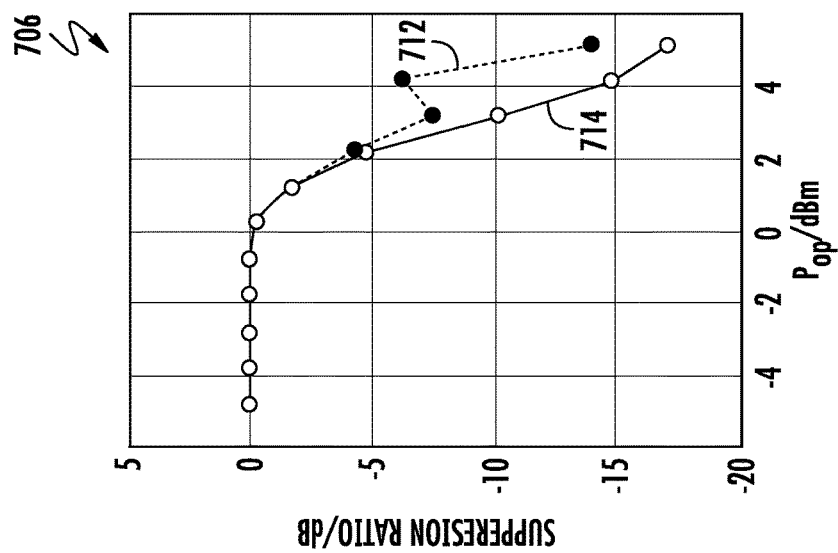

FIGS. 7C-7E are graphic plots 706, 708, and 710, respectively, providing exemplary illustrations of suppression ratios of different harmonics with the quantic polynomial modeling performed by the signal processing circuit 638. In each of the graphic plots 706, 708, and 710, dotted curves 712 represent conventional SIC implementation, while solid curves 714 represent SIC implementation with optimal synchronizations as described in the present disclosure. As shown in FIGS. 7C-7E, it is possible to achieve more stable interference suppression with optimal synchronization for SIC.

Figure 7F:
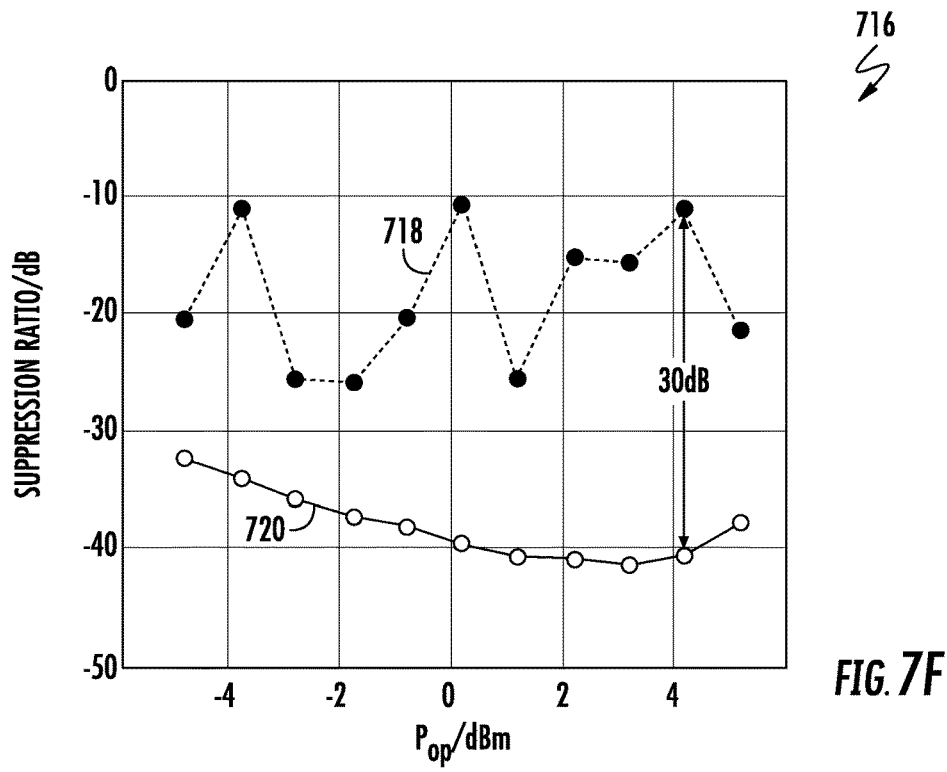

FIG. 7F is a graphic plot 716 providing an exemplary illustration of interference suppression ratios under various optical power $P_{op}$ values. The graphic plot 716 includes a first curve 718 representing interference suppression ratios under conventional SIC and a second curve 720 representing interference suppression ratios with optimal synchronization for SIC. As shown in FIG. 7F, it is possible to improve interference suppression ratios by as much as 30 dB with optimal synchronization for SIC.

Figure 7G:
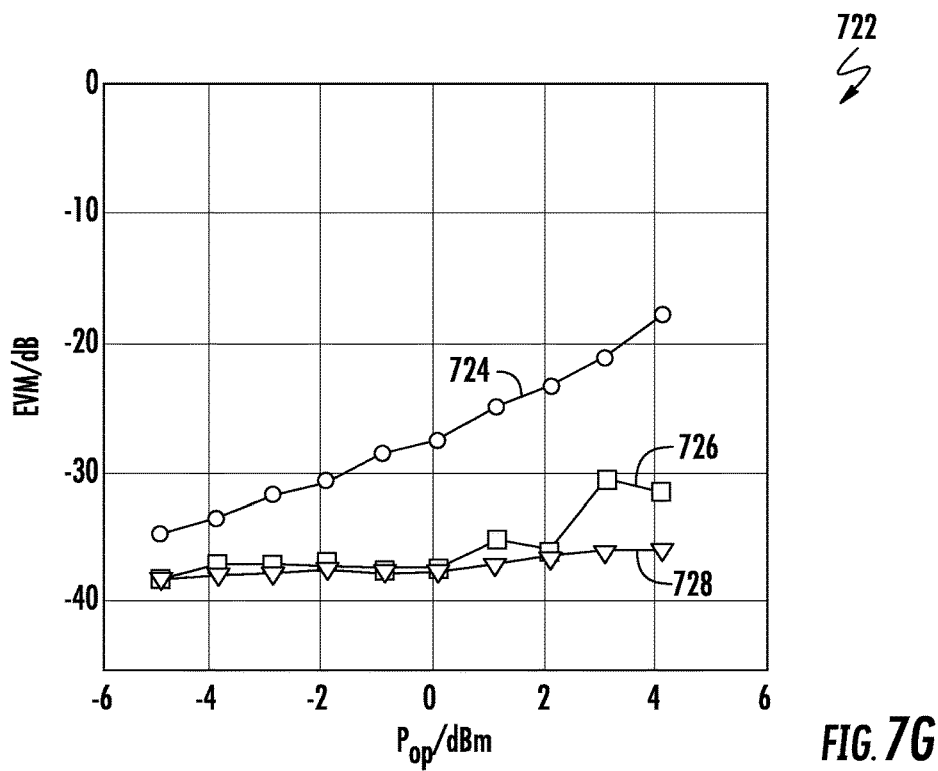

FIG. 7G is a graphic plot 722 providing an exemplary illustration of a relationship between an error vector magnitude (EVM) of the SDR uplink signal 610U and various optical power $P_{op}$ values. The graphic plot 722 includes a first EVM curve 724 representing EVM variations without SIC, a second EVM curve 726 representing EVM variations with conventional SIC, and a third EVM curve 728 representing EVM variations with optimal synchronization for SIC. As shown in the third EVM curve 728, SIC with optimal synchronization outperforms the conventional SIC when $P_{op}$ is greater than zero.

Figure 7H:
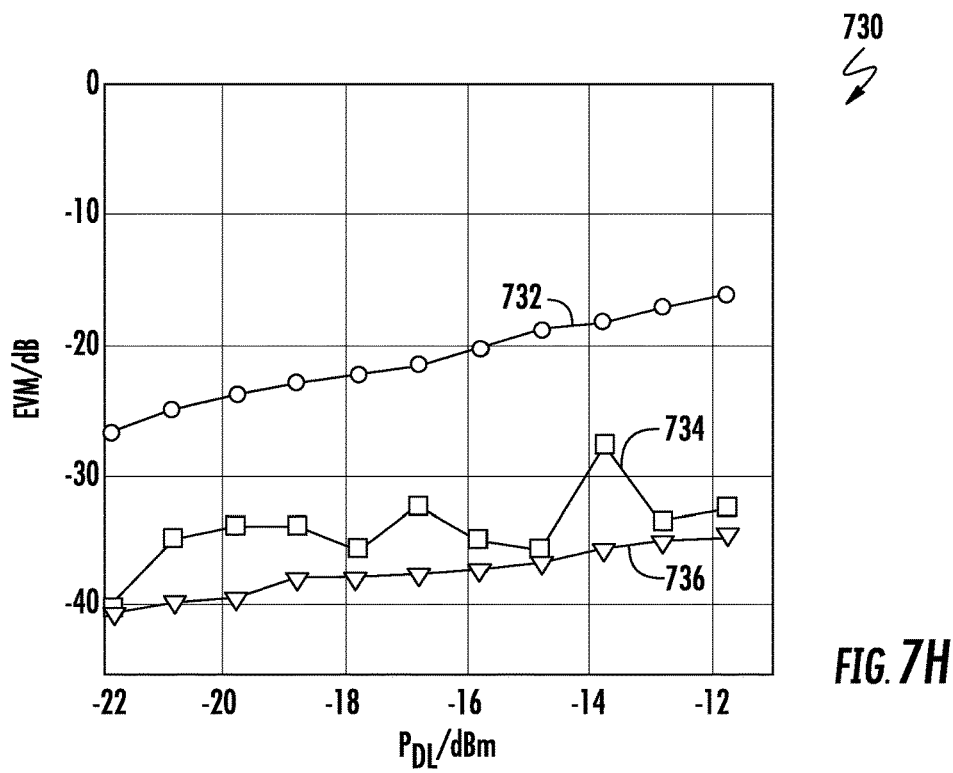

FIG. 7H is a graphic plot 730 providing an exemplary illustration of a relationship between an EVM of the SDR uplink signal 610U and power of the SDR downlink signal 610D in the combined SDR uplink signal 630. The graphic plot 730 includes a first EVM curve 732 representing EVM variations without SIC, a second EVM curve 734 representing EVM variations with conventional SIC, and a third EVM curve 736 representing EVM variations with optimal synchronization for SIC. As shown in the third EVM curve 736, SIC with optimal synchronization provides up to 9 dB EVM reduction with respect to conventional SIC.

Figure 7I:
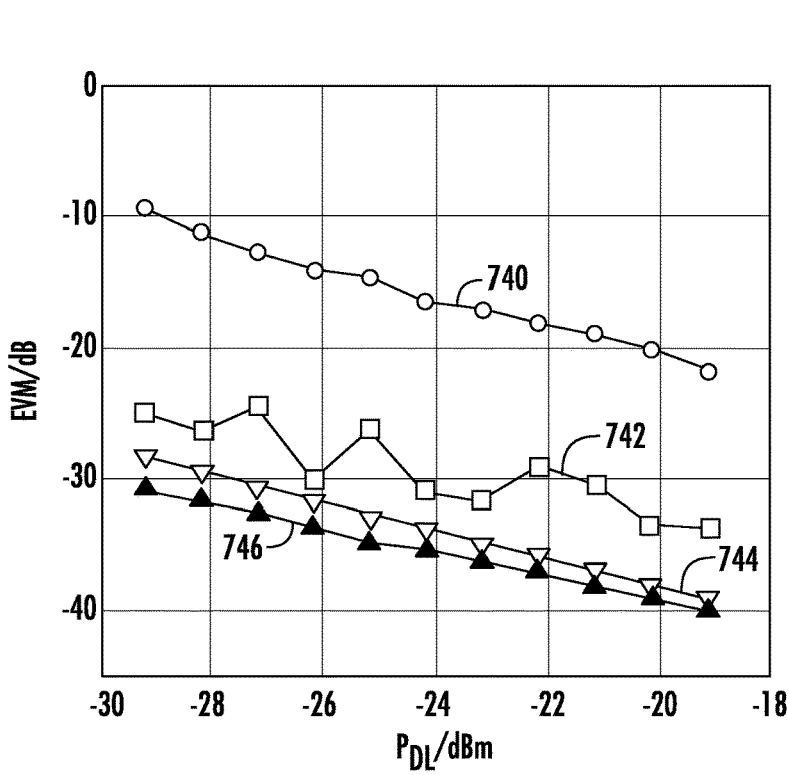

FIG. 7I is a graphic plot 738 providing an exemplary illustration of a relationship between EVM and power of the SDR uplink signal 610U. The graphic plot 738 includes a first EVM curve 740 representing EVM variations without SIC, a second EVM curve 742 representing EVM variations with conventional SIC, a third EVM curve 744 representing EVM variations with optimal synchronization for SIC and the presence of in-band and/or out-of-band interference, and a fourth EVM curve 746 representing EVM variations with optimal synchronization for SIC and an absence of in-band and/or out-of-band interference. As shown in FIG. 7I, SIC with optimal synchronization can achieve a signal quality closest to an interference-free transmission and outperforms conventional SIC.

Note that any of the communications signals, bands, and services described herein may be RF communications signals, bands, and services. Supported RF communications services in the WDSs disclosed herein can include any communications bands desired. Examples of communications services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDS can be configured to support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

Figure 8:
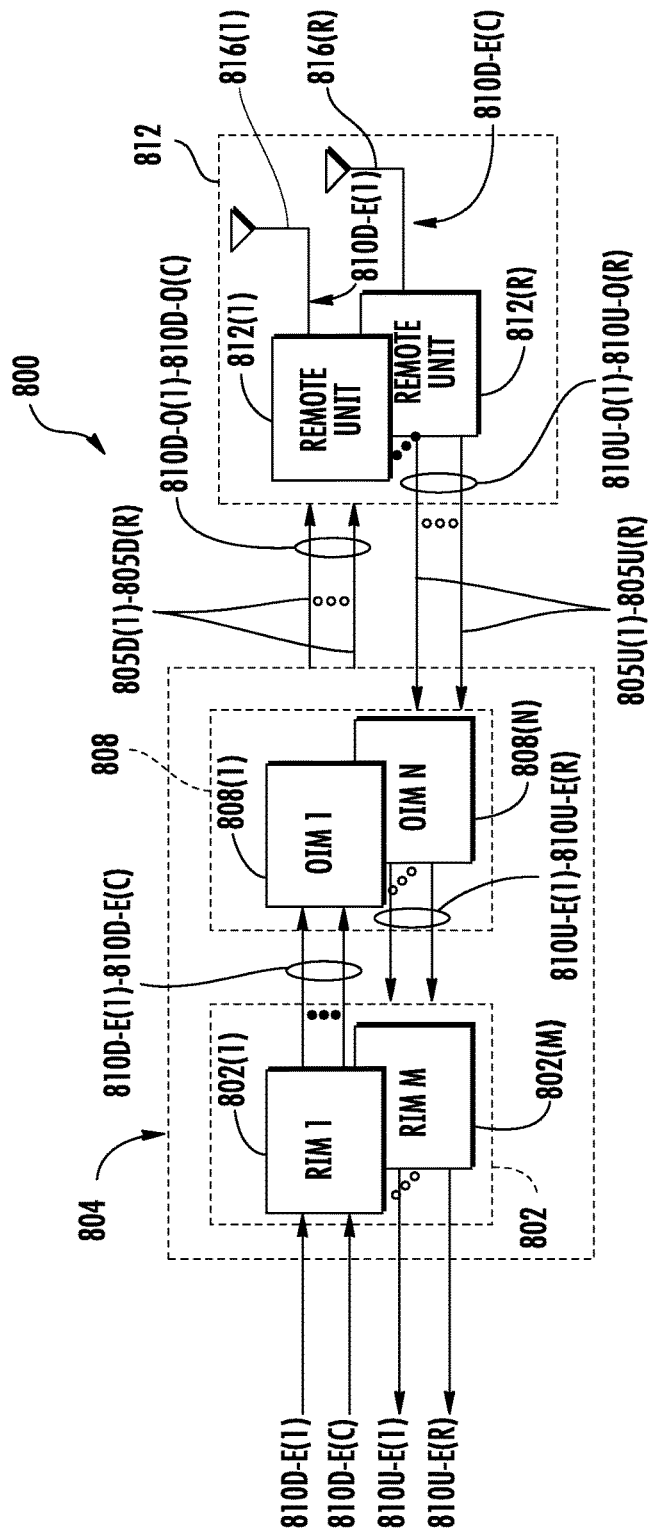
FIG. 8 is a schematic diagram of such an exemplary optical-fiber based WDS in which a head-end unit (HEU), including the communication circuit of FIGS. 3 and 5, may be deployed to enable optimal synchronization for SIC.

An HEU including the communication circuit 300 of FIGS. 3 and 5 configured to enable optimal synchronization for SIC can be provided in an optical-fiber-based WDS. In this regard, FIG. 8 is a schematic diagram of such an exemplary optical-fiber-based WDS 800. The optical-fiber-based WDS 800 is comprised of three (3) main components. One or more radio interfaces provided in the form of radio interface modules (RIMs) 802(1)-802(M) are provided in a central unit 804 to receive and process RF downlink communications signals 810D-E(1)-810D-E(C) prior to optical conversion into optical downlink communications signals. The RIMs 802(1)-802(M) provide both downlink and uplink interfaces for signal processing. The notations "1-M" and "1-C" indicate that any number of the referenced component, 1-M and 1-C, respectively, may be provided.

With continuing reference to FIG. 8, the central unit 804 is configured to accept the RIMs 802(1)-802(M) as modular components that can easily be installed and removed or replaced in the central unit 804. In a non-limiting example, the central unit 804 can include the communication circuit 300 of FIGS. 3 and 5 to enable optimal synchronization for SIC. In one embodiment, the central unit 804 is configured to support up to twelve (12) RIMs 802(1)-802(12). Each RIM 802(1)-802(M) can be designed to support a particular type of radio source or range of radio sources (i.e., frequencies) to provide flexibility in configuring the central unit 804 and the optical-fiber-based WDS 800 to support the desired radio sources. For example, one RIM 802 may be configured to support the PCS radio band. Another RIM 802 may be configured to support the 700 MHz radio band. In this example, by inclusion of these RIMs 802, the central unit 804 could be configured to support and distribute communications signals, including those for the communications services and communications bands described above as examples.

The RIMs 802(1)-802(M) may be provided in the central unit 804 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the RF downlink communications signals 810D-E(1)-810D-E(C) may be provided as downlink RF spectrum chunks to a plurality of optical interfaces provided in the form of optical interface modules (OIMs) 808(1)-808(N) in this embodiment to convert the unlicensed and/or licensed RF downlink communications signals 810D-E(1)-810D-E(C) into optical downlink communications signals 810D-O(1)-810D-O(C). The OIMs 808(1)-808(N) may be configured to provide one or more optical interface components (OICs) that contain optical-to-electrical (O-E) and electrical-to-optical (E-O) converters, as will be described in more detail below. The OIMs 808(1)-808(N) support the radio bands that can be provided by the RIMs 802(1)-802(M), including the examples previously described above.

The OIMs 808(1)-808(N) each include E-O converters to convert the RF downlink communications signals 810D-E(1)-810D-E(C) into the optical downlink communications signals 810D-O(1)-810D-O(C). The optical downlink communications signals 810D-O(1)-810D-O(C) are communicated over a plurality of downlink optical fiber communications media 805D(1)-805D(R) to a plurality of remote units 812(1)-812(R). O-E converters provided in the remote units 812(1)-812(R) convert the optical downlink communications signals 810D-O(1)-810D-O(C) back into the RF downlink communications signals 810D-E(1)-810D-E(C), which are provided to antennas 816(1)-816(R) in the remote units 812(1)-812(R) to user equipment (not shown) in the reception range of the antennas 816(1)-816(R).

E-O converters are also provided in the remote units 812(1)-812(R) to convert RF uplink communications signals 810U-E(1)-810U-E(R) received from the user equipment through the antennas 816(1)-816(R) into optical uplink communications signals 810U-O(1)-810U-O(R). The remote units 812(1)-812(R) communicate the optical uplink communications signals 810U-O(1)-810U-O(R) over a plurality of uplink optical fiber communications media 805U(1)-805U(R) to the OIMs 808(1)-808(N) in the central unit 804. The OIMs 808(1)-808(N) include O-E converters that convert the received optical uplink communications signals 810U-O(1)-810U-O(R) into RF uplink communications signals 810U-E(1)-810U-E(R), which are processed by the RIMs 802(1)-802(M) and provided as the RF uplink communications signals 810U-E(1)-810U-E(R).

Note that the downlink optical fiber communications media 805D(1)-805D(R) and uplink optical fiber communications media 805U(1)-805U(R) connected to each remote unit 812(1)-812(R) may be a common optical fiber communications medium, wherein for example, wave division multiplexing (WDM) may be employed to provide the optical downlink communications signals 810D-O(1)-810D-O(C) and the optical uplink communications signals 810U-O(1)-810U-O(R) on the same optical fiber communications medium.

Figure 9:
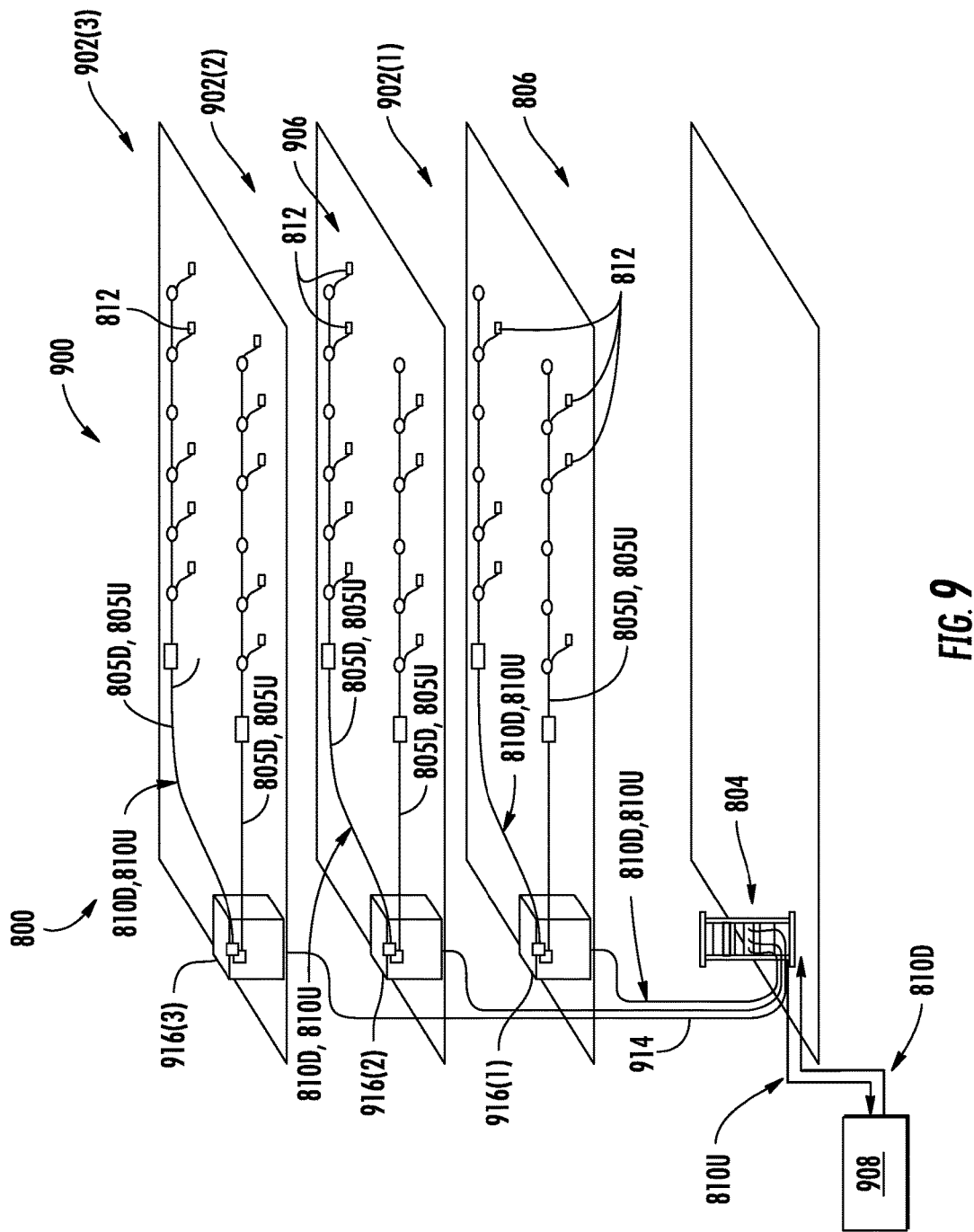
FIG. 9 is a partial schematic cut-away diagram of a building infrastructure employing the WDS of FIG. 8.

The optical-fiber-based WDS 800 of FIG. 8 including the communication circuit 300 of FIGS. 3 and 5 configured to enable optimal synchronization for SIC can be provided in an indoor environment, such as illustrated in FIG. 9. In this regard, FIG. 9 is a partial schematic cut-away diagram of a building infrastructure 900 employing the optical-fiber-based WDS 800 of FIG. 8. The building infrastructure 900 in this embodiment includes a first (ground) floor 902(1), a second floor 902(2), and a third floor 902(3). The floors 902(1)-902(3) are serviced by the central unit 804 to provide antenna coverage areas 906 in the building infrastructure 900. The central unit 804 is configured to receive downlink communications signals 810D from a signal source 908. The central unit 804 is communicatively coupled to the remote units 812 to receive uplink communications signals 810U from the remote units 812, similar to that as previously discussed above for other WDSs. The downlink and uplink communications signals 810D and 810U communicated between the central unit 804 and the remote units 812 are carried over a riser cable 914 in this example. The riser cable 914 may be routed through interconnect units (ICUs) 916(1)-916(3) dedicated to each floor 902(1)-902(3) that route the downlink and uplink communications signals 810D and 810U to the remote units 812 and also provide power to the remote units 812 via the downlink and uplink communications media 805D and 805U.

Figure 10:
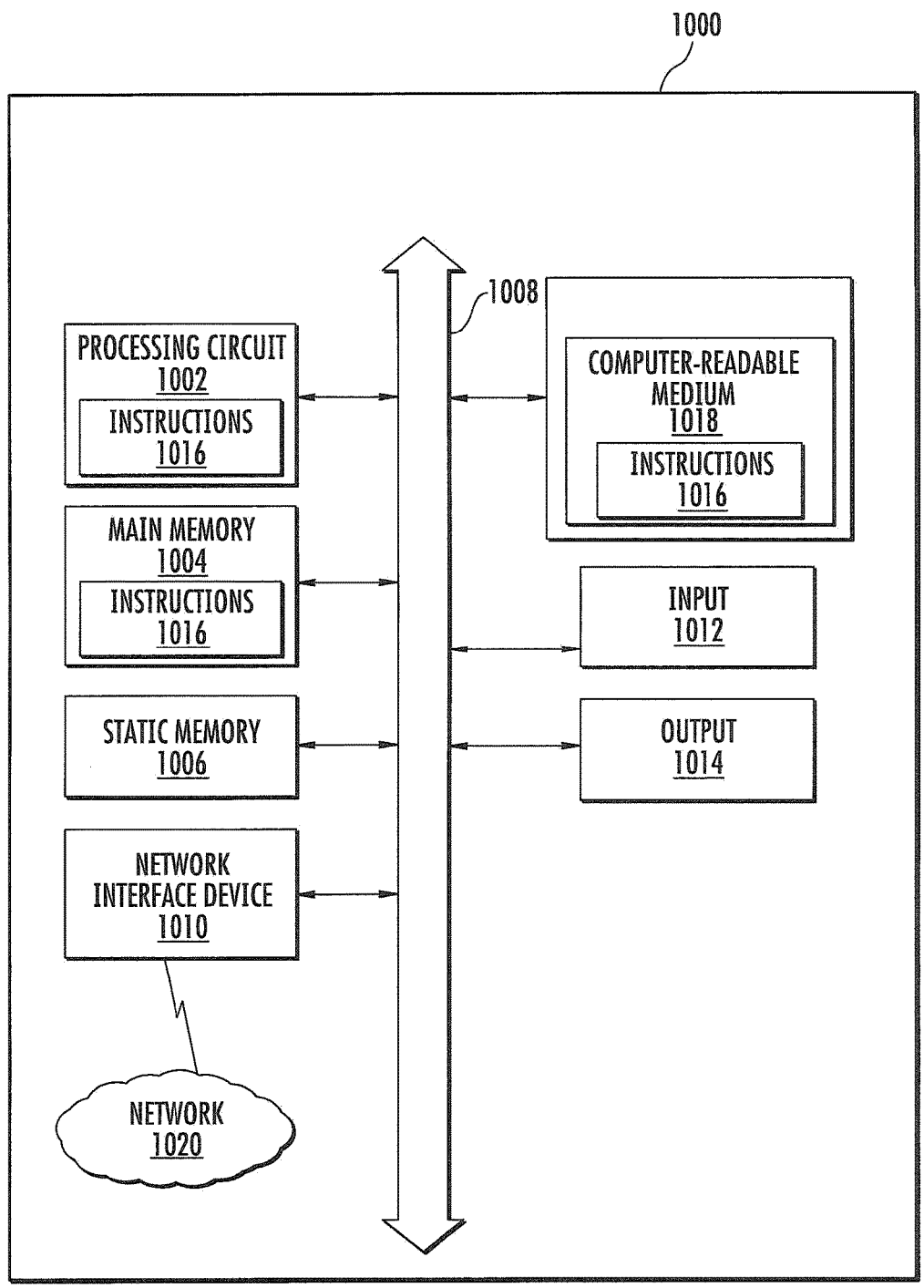
FIG. 10 is a schematic representation of additional detail illustrating a computer system that could be employed in the communication circuit of FIGS. 3 and 5 to enable optimal synchronization for SIC.

FIG. 10 is a schematic representation of additional detail illustrating a computer system 1000 that could be employed in the control circuitry 310 of FIGS. 3 and 5 to enable optimal synchronization for SIC. In a non-limiting example, the computer system 1000 can function as the control circuitry 310 of FIGS. 3 and 5. In this regard, the computer system 1000 is adapted to execute instructions from an exemplary computer-readable medium to perform these and/or any of the functions or processing described herein.

In this regard, the computer system 1000 in FIG. 10 may include a set of instructions that may be executed to program and configure programmable digital signal processing circuits in a WDS for supporting scaling of supported communications services. The computer system 1000 may be connected (e.g., networked) to other machines in a local area network (LAN), an intranet, an extranet, or the Internet.

While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing circuit or processor 1002, a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or the static memory 1006 directly or via some other connectivity means. In one non-limiting example, the main memory 1004 and/or the static memory 1006 can be used to store the LUT 324 of FIGS. 3 and 5. The processor 1002 may be a controller, and the main memory 1004 or the static memory 1006 may be any type of memory.

The processor 1002 represents one or more general-purpose processing devices, such as a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. In another non-limiting example, computer-readable medium 1018 can be used to store the LUT 324 of FIGS. 3 and 5. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical media, and magnetic media.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or a similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a DSP, an Application Specific Integrated Circuit (ASIC), an FPGA, or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A communication circuit in a wireless communications system (WCS), comprising:
    a transmit circuit configured to transmit at least one downlink communications signal in at least one downlink band;
    a receive circuit configured to receive at least one uplink communications signal in at least one uplink band, wherein the at least one uplink communications signal comprises at least one interference signal leaked from the transmit circuit to the receive circuit; and
    a signal processing circuit coupled to the transmit circuit and the receive circuit, the signal processing circuit configured to:
        receive the at least one downlink communications signal and the at least one uplink communications signal;
        determine an anchor downlink signal based on the at least one downlink communications signal;
        determine an anchor temporal term and an anchor phase term associated with the anchor downlink signal;
        determine at least one optimal temporal term and at least one optimal phase term configured to suppress the at least one interference signal in the at least one uplink band;
        generate at least one phase-synchronized uplink signal comprising the at least one uplink communications signal and having a linear phase shift defined by the anchor temporal term, the anchor phase term, the at least one optimal temporal term, and the at least one optimal phase term; and
        suppress the at least one interference signal in the at least one uplink band based on the at least one phase-synchronized uplink signal.

2. The communication circuit of claim 1, wherein the signal processing circuit comprises:
    self-interference cancellation (SIC) circuitry configured to receive the at least one downlink communications signal; and
    control circuitry configured to:
        receive the at least one uplink communications signal from the receive circuit;
        determine the anchor downlink signal based on the at least one downlink communications signal;
        determine the anchor temporal term and the anchor phase term associated with the anchor downlink signal;
        determine the at least one optimal temporal term and the at least one optimal phase term;
        generate the at least one phase-synchronized uplink signal comprising the at least one uplink communications signal and having the linear phase shift defined by the anchor temporal term, the anchor phase term, the at least one optimal temporal term, and the at least one optimal phase term; and
        provide the at least one phase-synchronized uplink signal to the SIC circuitry;
    wherein the SIC circuitry is further configured to suppress the at least one interference signal based on the at least one phase-synchronized uplink signal.

3. The communication circuit of claim 2, wherein the control circuitry is further configured to retrieve the at least one optimal temporal term and the at least one optimal phase term from a lookup table (LUT) based on the at least one uplink band.

4. The communication circuit of claim 3 configured to operate in a calibration mode, wherein:
the transmit circuit is further configured to transmit the at least one downlink communications signal in the at least one downlink band;
the receive circuit is further configured to receive at least one returned interference signal caused by the at least one downlink communications signal and leaked from the transmit circuit to the receive circuit;
the control circuitry is further configured to phase-shift the at least one returned interference signal to generate a plurality of phase-shifted reference signals, each of the plurality of phase-shifted reference signals associated with a respective temporal term and a respective phase term;
the SIC circuitry is further configured to suppress the at least one returned interference signal to a plurality of suppression levels based on the plurality of phase-shifted reference signals; and
the control circuitry is further configured to:
determine a maximum suppression level among the plurality of suppression levels;
determine an optimal phase-shifted reference signal among the plurality of phase-shifted reference signals causing the at least one returned interference signal to be suppressed to the maximum suppression level in the at least one downlink band and/or the at least one uplink band; and
record the respective temporal term and the respective phase term of the optimal phase-shifted reference signal in the LUT in association with the at least one downlink band and/or the at least one uplink band.

5. The communication circuit of claim 3, wherein:
the transmit circuit is further configured to:
transmit a first downlink communications signal in a first downlink band based on a full-duplex (FDx) scheme; and
transmit a second downlink communications signal in a second downlink band based on a frequency-division duplex (FDD) scheme; and
the receive circuit is further configured to:
receive a first uplink communications signal comprising a first interference signal in a first uplink band based on the FDx scheme; and
receive a second uplink communications signal comprising a second interference signal in a second uplink band based on the FDD scheme.

6. The communication circuit of claim 5, wherein:
the first interference signal in the first uplink band comprises the first downlink communications signal leaked from the transmit circuit to the receive circuit; and
the second interference signal in the second uplink band comprises:
the second downlink communications signal leaked from the transmit circuit to the receive circuit; and
a third-order intermodulation distortion (IMD3) signal caused by the first downlink communications signal and the second downlink communications signal and leaked from the transmit circuit to the receive circuit.

7. The communication circuit of claim 5, wherein:
the control circuitry is further configured to:
determine the anchor downlink signal among the first downlink communications signal and the second downlink communications signal, wherein the anchor downlink signal is transmitted in an anchor band among the first downlink band and the second downlink band;
determine an anchor phase response of the anchor downlink signal;
perform linear regression based on the anchor phase response to determine the anchor temporal term and the anchor phase term associated with the anchor downlink signal;
retrieve an optimal anchor temporal term and an optimal anchor phase term from the LUT based on the anchor band;
retrieve a first optimal uplink temporal term and a first optimal uplink phase term from the LUT based on the first uplink band;
generate a first phase-synchronized uplink signal comprising:
a first temporal term defined by the anchor temporal term, the optimal anchor temporal term, and the first optimal uplink temporal term; and
a first phase term defined by the anchor phase term, the optimal anchor phase term, and the first optimal uplink phase term; and
provide the first phase-synchronized uplink signal to the SIC circuitry; and
the SIC circuitry is further configured to suppress the first interference signal in the first uplink band based on the first phase-synchronized uplink signal.

8. The communication circuit of claim 7, wherein:
the control circuitry is further configured to:
retrieve a second optimal uplink temporal term and a second optimal uplink phase term from the LUT based on the second uplink band;
generate a second phase-synchronized uplink signal comprising:
a second temporal term defined by the anchor temporal term, the optimal anchor temporal term, and the second optimal uplink temporal term; and
a second phase term defined by the anchor phase term, the optimal anchor phase term, and the second optimal uplink phase term; and
provide the second phase-synchronized uplink signal to the SIC circuitry; and
the SIC circuitry is further configured to suppress the second interference signal in the second uplink band based on the second phase-synchronized uplink signal.

9. The communication circuit of claim 7, wherein the control circuitry is further configured to determine the anchor downlink signal as a downlink communications signal having a strongest root-mean-square (RMS) power among the first downlink communications signal and the second downlink communications signal.

10. The communication circuit of claim 1 provided in a head-end unit (HEU) in a wireless distribution system (WDS).

11. A method for enabling optimal synchronization for self-interference cancellation (SIC) in a wireless communications system (WCS), comprising:
transmitting at least one downlink communications signal in at least one downlink band;
receiving at least one uplink communications signal comprising at least one interference signal in at least one uplink band;
determining an anchor downlink signal based on the at least one downlink communications signal;
determining an anchor temporal term and an anchor phase term associated with the anchor downlink signal;

determining at least one optimal temporal term and at least one optimal phase term configured to suppress the at least one interference signal in the at least one uplink band;
generating at least one phase-synchronized uplink signal comprising the at least one uplink communications signal and having a linear phase shift defined by the anchor temporal term, the anchor phase term, the at least one optimal temporal term, and the at least one optimal phase term; and
suppressing the at least one interference signal in the at least one uplink band based on the at least one phase-synchronized uplink signal.

12. The method of claim 11, further comprising retrieving the at least one optimal temporal term and the at least one optimal phase term from a lookup table (LUT) based on the at least one uplink band.

13. The method of claim 12, further comprising:
transmitting the at least one downlink communications signal in the at least one downlink band;
receiving at least one returned interference signal caused by the at least one downlink communications signal;
phase shifting the at least one returned interference signal to generate a plurality of phase-shifted reference signals, each of the plurality of phase-shifted reference signals associated with a respective temporal term and a respective phase term;
suppressing the at least one returned interference signal to a plurality of suppression levels based on the plurality of phase-shifted reference signals;
determining a maximum suppression level among the plurality of suppression levels;
determining an optimal phase-shifted reference signal among the plurality of phase-shifted reference signals causing the at least one returned interference signal to be suppressed to the maximum suppression level in the at least one downlink band and/or the at least one uplink band; and
recording the respective temporal term and the respective phase term of the optimal phase-shifted reference signal in the LUT in association with the at least one downlink band and/or the at least one uplink band.

14. The method of claim 12, further comprising:
transmitting a first downlink communications signal in a first downlink band based on a full-duplex (FDx) scheme;
transmitting a second downlink communications signal in a second downlink band based on a frequency-division duplex (FDD) scheme;
receiving a first uplink communications signal comprising a first interference signal in a first uplink band based on the FDx scheme; and
receiving a second uplink communications signal comprising a second interference signal in a second uplink band based on the FDD scheme.

15. The method of claim 14, further comprising:
determining the anchor downlink signal among the first downlink communications signal and the second downlink communications signal, wherein the anchor downlink signal is transmitted in an anchor band among the first downlink band and the second downlink band;
determining an anchor phase response of the anchor downlink signal;
performing linear regression based on the anchor phase response to determine the anchor temporal term and the anchor phase term associated with the anchor downlink signal;
retrieving an optimal anchor temporal term and an optimal anchor phase term from the LUT based on the anchor band;
retrieving a first optimal uplink temporal term and a first optimal uplink phase term from the LUT based on the first uplink band;
generating a first phase-synchronized uplink signal comprising:
a first temporal term defined by the anchor temporal term, the optimal anchor temporal term, and the first optimal uplink temporal term; and
a first phase term defined by the anchor phase term, the optimal anchor phase term, and the first optimal uplink phase term; and
suppressing the first interference signal in the first uplink band based on the first phase-synchronized uplink signal.

16. The method of claim 15, further comprising:
retrieving a second optimal uplink temporal term and a second optimal uplink phase term from the LUT based on the second uplink band;
generating a second phase-synchronized uplink signal comprising:
a second temporal term defined by the anchor temporal term, the optimal anchor temporal term, and the second optimal uplink temporal term; and
a second phase term defined by the anchor phase term, the optimal anchor phase term, and the second optimal uplink phase term; and
suppressing the second interference signal in the second uplink band based on the second phase-synchronized uplink signal.

17. The method of claim 15, further comprising determining the anchor downlink signal as a downlink communications signal having a strongest root-mean-square (RMS) power among the first downlink communications signal and the second downlink communications signal.

18. A wireless distribution system (WDS), comprising:
a plurality of remote units; and
a head-end unit (HEU) coupled to the plurality of remote units via a plurality of communications media, respectively, the HEU configured to:
distribute a plurality of downlink communications signals to the plurality of remote units via the plurality of communications media, respectively; and
receive a plurality of uplink communications signals from the plurality of remote units via the plurality of communications media, respectively;
wherein the HEU comprises a communication circuit, the communication circuit comprising:
a transmit circuit configured to transmit at least one downlink communications signal among the plurality of downlink communications signals in at least one downlink band;
a receive circuit configured to receive at least one uplink communications signal among the plurality of uplink communications signals in at least one uplink band, wherein the at least one uplink communications signal comprises at least one interference signal leaked from the transmit circuit to the receive circuit; and
a signal processing circuit coupled to the transmit circuit and the receive circuit, the signal processing circuit is configured to:
receive the at least one downlink communications signal and the at least one uplink communications signal;

determine an anchor downlink signal based on the at least one downlink communications signal;

determine an anchor temporal term and an anchor phase term associated with the anchor downlink signal;

determine at least one optimal temporal term and at least one optimal phase term configured to suppress the at least one interference signal in the at least one uplink band;

generate at least one phase-synchronized uplink signal comprising the at least one uplink communications signal and having a linear phase shift defined by the anchor temporal term, the anchor phase term, the at least one optimal temporal term, and the at least one optimal phase term; and suppress the at least one interference signal in the at least one uplink band based on the at least one phase-synchronized uplink signal.

19. The WDS of claim 18, wherein the plurality of remote units is a plurality of software-defined remote units.

20. The WDS of claim 18, wherein the HEU is coupled to the plurality of remote units via a plurality of optical fiber communications media, respectively, wherein:

the HEU is further configured to:

receive a plurality of radio frequency (RF) downlink communications signals;

convert the plurality of RF downlink communications signals into a plurality of optical downlink communications signals, respectively;

distribute the plurality of optical downlink communications signals to the plurality of remote units via the plurality of optical fiber communications media, respectively;

receive a plurality of optical uplink communications signals from the plurality of remote units via the plurality of optical fiber communications media, respectively; and convert the plurality of optical uplink communications signals into a plurality of RF uplink communications signals, respectively; and the plurality of remote units is further configured to:

receive the plurality of optical downlink communications signals via the plurality of optical fiber communications media, respectively;

convert the plurality of optical downlink communications signals into the plurality of RF downlink communications signals, respectively;

receive the plurality of RF uplink communications signals;

convert the plurality of RF uplink communications signals into the plurality of optical uplink communications signals, respectively; and provide the plurality of optical uplink communications signals to the HEU via the plurality of optical fiber communications media, respectively.

* * * * *